United States Patent
Adachi et al.

(10) Patent No.: US 6,636,630 B1
(45) Date of Patent: Oct. 21, 2003

(54) IMAGE-PROCESSING APPARATUS

(75) Inventors: Yasushi Adachi, Nara (JP); Toshihiro Kanata, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/580,917

(22) Filed: May 26, 2000

(30) Foreign Application Priority Data

May 28, 1999 (JP) .......................................... 11-150674

(51) Int. Cl.⁷ ................................................ G06K 9/34
(52) U.S. Cl. ...................... 382/176; 382/164; 382/173; 382/181; 382/194; 382/224; 382/237; 358/2.1; 358/448; 358/462
(58) Field of Search ................................. 382/162, 164, 382/173, 176, 181, 190, 194, 205, 220, 221, 224, 237, 270; 358/2.1, 448, 450, 462, 463

(56) References Cited

U.S. PATENT DOCUMENTS

| 4,722,008 A | | 1/1988 | Ibaraki et al. ............... 358/283 |
| 4,893,188 A | * | 1/1990 | Murakami et al. ........... 358/2.1 |
| 5,101,438 A | * | 3/1992 | Kanda et al. ................ 382/176 |
| 5,109,436 A | * | 4/1992 | Machida et al. ............. 382/270 |
| 5,166,810 A | * | 11/1992 | Sorimachi et al. .......... 358/462 |
| 5,768,403 A | * | 6/1998 | Suzuki et al. ................ 358/2.1 |

FOREIGN PATENT DOCUMENTS

| JP | 62-147860 | 7/1987 | ............ H04N/1/40 |
| JP | 5-14701 | 1/1993 | ............ H04N/1/40 |
| JP | 6-152944 | 5/1994 | ............ G06F/15/68 |
| JP | 6-178097 | 6/1994 | ............ G06F/15/68 |

* cited by examiner

Primary Examiner—Daniel G. Mariam
(74) Attorney, Agent, or Firm—Edwards & Angell, LLP; David G. Conlin; George W. Hartnell, III

(57) ABSTRACT

An area-separation processing section, installed in an image-processing apparatus of the present invention, is provided with a block memory A for storing image signals, a maximum/minimum pixel detection section, a maximum/minimum pixel feature-amount calculation section and a maximum/minimum pixel classifying section that make a judgment as to what kind of maximum pixel or minimum pixel a target pixel A within the block memory A forms, a block memory B for storing classifying signals outputted from the maximum/minimum pixel classifying section, and a mesh feature-amount calculation section and a mesh judgment section that make a judgment as to whether or not a target pixel B within the block memory B belongs to a mesh area

24 Claims, 13 Drawing Sheets

F I G. 9
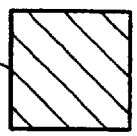

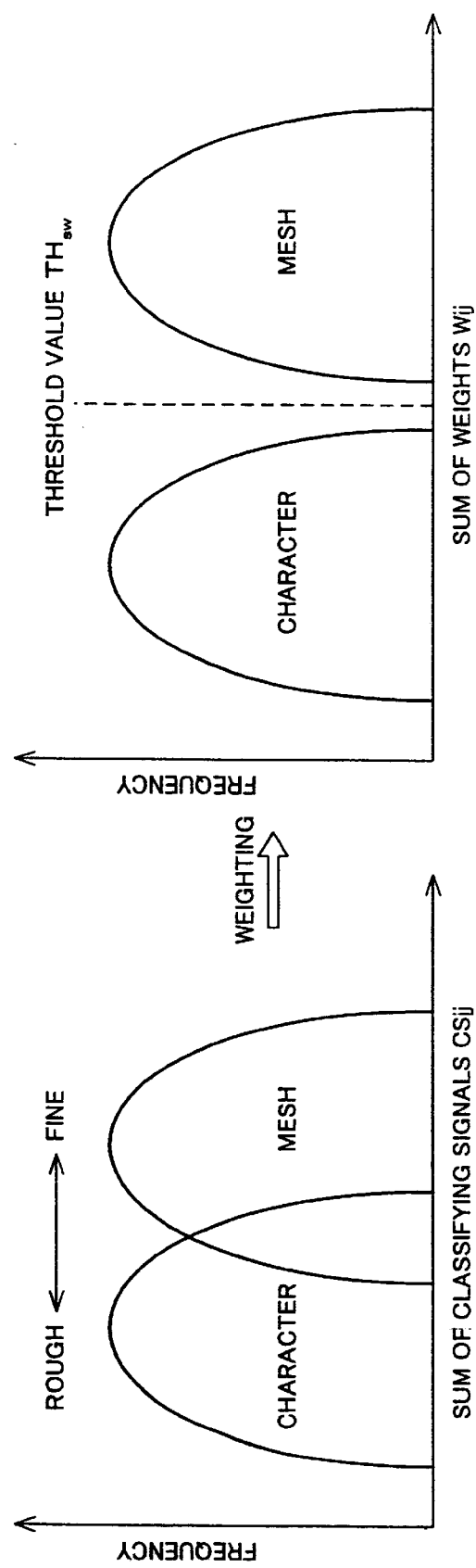
F I G. 12

IMAGE-PROCESSING APPARATUS

FIELD OF THE INVENTION

The present invention relates to an image-processing apparatus for use in digital copying machines, facsimile machines, etc. which carries out discrimination on character, photograph and mesh areas by extracting the amount of feature of each pixel from an image signal that has obtained by scanning a document.

BACKGROUND OF THE INVENTION

Conventionally, in digital copying machines and facsimile machines, in order to improve the picture quality of recorded images, image processing is carried out on image signals that have been obtained by reading a document having a character area, photograph area or mesh area or a document having a mixed portion of these areas, using a CCD (Charge Coupled Device) image sensor, or other devices.

The above-mentioned image processing includes a process for discriminating whether a read image belongs to a character, photograph or mesh image, and for carrying out an appropriate process for each pixel based upon the results of the discrimination. With respect to this type of image discrimination method for improving the image quality, examples thereof include a method in which an image is divided into blocks each having a plurality of pixels and each block is subjected to a pattern matching process, and a method in which the image discrimination is carried out on each block by using feature parameters representing characteristics of character images and mesh images. However, in the image discrimination method using the pattern matching process, many patterns have to be prepared, raising problems of an increase in memory capacity and degradation in general applicability. For this reason, in recent years, the image discrimination method using feature parameters has come to be widely used.

With respect to the image discrimination method using feature parameters, U.S. Pat. No. 4,722,008 (Date of Patent: Jan. 26, 1988) (corresponding to "Japanese Laid-Open Patent Application No. 194968/1986 (Tokukaishou 61-194968, published on Aug. 29, 1986)") discloses a mesh-photograph area discrimination method. In this method, a document is divided into blocks, each having a plurality of pixels, and changes in signal levels in two continuous pixels located in a predetermined space within a block are measured in a separated manner between the case in which the two pixels continue in the main scanning direction and the case in which the two pixels continue in the sub scanning direction, and the sum of the measured values in each block is compared with each predetermined value, and the image is discriminated based upon the results of the comparison.

Moreover, with respect to another image discrimination method using feature parameters, Japanese Laid-Open Patent Application No. 147860/1987 (Tokukaishou 62-147860, published on Jul. 1, 1987) discloses a half-tone facsimile signal processing system. In this system, first, a difference between the maximum signal level and the minimum signal level within a block is found, and the value of the difference is compared with a preset value. In the case when the difference between the maximum signal level and the minimum signal level is smaller than the above-mentioned preset value, a judgment signal indicating a portion having a moderate signal level change that is supposed to be a picture portion is outputted. In contrast, in the case when the difference between the maximum signal level and the minimum signal level is greater than the above-mentioned set value, a judgment signal indicating a portion having an abrupt signal level change that is supposed to be an outline of a character and a photograph portion or a mesh-photograph portion. Moreover, in accordance with a predetermined accessing order within a block, the number of changes between the signal levels of respective two pixels that are spatially continuous is compared with a predetermined value, and in the case when the number of changes between the signal levels is greater than the predetermined value, a judgment signal indicating that the block in question belongs to a mesh area is outputted. In contrast, when the number of changes between the signal levels is smaller than the predetermined value, a judgment signal indicating that the block in question is not a mesh area is outputted. Thus, in response to these judgment signals, signal processing is carried out on pixels within each block.

Moreover, with respect to a conventional technique using maximum and minimum points among methods using feature parameters, Japanese Laid-Open Patent Application No. 14701/1993 (Tokukaihei 5-14701, published on Jan. 22, 1993) discloses an area discrimination device. In this area discrimination device, a threshold value is set based upon the difference between the maximum and minimum densities of pixels within a block consisting of a plurality of pixels. Then, the pixels within the block are successively scanned, and a change in the output amplitude, generated by density differences of the pixels, exceeds the above-mentioned threshold value, an output signal is generated. When the number of generations of the output signals exceeds a predetermined number of times, a judgment is made that the block in question belongs to a half-tone area.

Moreover, with respect to a conventional technique using another method in which the maximum and minimum points are adopted, Japanese Laid-Open Patent Application No. 152944/1994 (Tokukaihei 6-152944, published on May 31, 1994) discloses a mesh extracting device. In this mesh extracting device, digital multi-value data is inputted thereto, and a maximum point and/or a minimum point in density in the main scanning direction are/is detected and set as a max/min pixel(s), and in the case when the intervals of the max/min pixels are in a predetermined range and when the number of max/min pixels that exist between the max/min pixels and are projected in the sub scanning direction is not less than a predetermined number, these max/min pixels are detected as mesh pixels.

Furthermore, with respect to a conventional technique using another method in which the maximum and minimum points are adopted, Japanese Laid-Open Patent Application No. 178097/1994 (Tokukaihei 6-178097, published on Jun. 24, 1994) discloses a mesh extracting device. In this mesh extracting device, digital multi-value data is inputted thereto, and a maximum point and/or a minimum point in density is/are detected in the main scanning direction as a horizontal max/min points so that the number of pixels between the horizontal max/min points is counted. Moreover, based upon the above-mentioned multi-value data, a maximum point and/or a minimum point in density is/are detected in the sub scanning direction as a vertical max/min points so that the number of pixels between the vertical max/min points is counted. With respect to horizontal max/min points in which the number of pixels located between the horizontal max/min points is in a predetermined range, when the number of pixels located between the vertical max/min points is in a predetermined range, the corresponding pixels are detected as mesh pixels.

However, in the above-mentioned conventional image discrimination methods using feature parameters, an erroneous judgment as to image discrimination tends to occur. Therefore, in order to achieve high-quality images, further improvements in the discrimination precision have been demanded.

It is considered that the above-mentioned erroneous judgment in image discrimination is caused by inappropriate feature parameters, that is, the use of feature parameters that fail to properly represent characteristics of the respective areas. Moreover, another major cause of the erroneous judgment is that a classifying method, used for image discrimination with respect to the amount of feature obtained by a feature parameter, is not appropriate, and that the selection of threshold values for the classification is not appropriate. In particular, in the case when the maximum point and the minimum point are used as the feature parameters, inappropriate extracting methods for maximum and minimum points and inappropriate feature parameters used for detecting mesh based upon the maximum point and minimum point information cause degradation in the precision in discriminating images.

SUMMARY OF THE INVENTION

The objective of the present invention is to improve precision in detecting a mesh area and also to enhance precision in discriminating each area by reducing any erroneous detection on a character area.

In order to achieve the above-mentioned objective, the image-processing apparatus of the present invention, which deals with an image signal obtained for each pixel by scanning a document and discriminates the pixel as to which area it is located, a character area, a photograph area or a mesh area, is characterized by comprising:

a first block memory for storing image signals of a first local block consisting of a pixel that is designated as a first target pixel and a plurality of pixels on the periphery of the first target pixel;

a maximum/minimum pixel detection section which makes a judgment as to whether the first target pixel is a maximum pixel that gives a maximum density value in the first local block or a minimum pixel that gives a minimum density value therein by using the image signals stored in the first block memory;

a maximum/minimum pixel feature-amount calculation section which calculates information as to density changes from the first target pixel to the peripheral pixels within the local block by using the image signals stored in the first block memory;

a maximum/minimum pixel classifying section which classifies the first target pixel by using a classifying signal obtained based upon outputs from the maximum/minimum pixel detection section and the maximum/minimum pixel feature-amount calculation section;

a second block memory for storing classifying signals outputted from the maximum/minimum pixel classifying section with respect to a second local block consisting of a pixel that is designated as a second target pixel and a plurality of pixels on the periphery of the second target pixel;

a mesh feature-amount calculation section for calculating the amount of feature of the second target pixel by using the classifying signals of the second local block stored in the second block memory; and a mesh judgment section which makes a judgment as to whether or not the second target pixel is a pixel belonging to a mesh area by using the amount of feature calculated by the mesh feature-amount calculation section.

With the above-mentioned arrangement, the maximum/minimum pixel detection section first makes a judgment as to whether the first target pixel is a maximum pixel that gives a maximum density value in the first local block or a minimum pixel that gives a minimum density value therein by using the image signals stored in the first block memory. Moreover, the maximum/minimum pixel feature-amount calculation section calculates information as to density changes from the first target pixel to the peripheral pixels within the first local block by using the image signals stored in the first block memory.

Next, the maximum/minimum pixel classifying section classifies the first target pixel by using a classifying signal obtained based upon outputs from the maximum/minimum pixel detection section and the maximum/minimum pixel feature-amount calculation section. In addition to the information as to whether the first target pixel is a maximum or minimum pixel, the classifying signal contains information indicating density changes in the peripheral pixels with respect to the first target pixel. Therefore, in the case when the first target pixel is a maximum or minimum pixel, the application of the classifying signal makes it possible to classify whether the first target pixel has a dot shape such as seen in a mesh area or a line shape such as seen in a character area. Since the first target pixel is an arbitrary pixel among image signals, each obtained for each pixel by scanning a document, the classification using the above-mentioned classifying signal can be applied to each pixel of the above-mentioned image signals.

Moreover, in the case when a certain pixel is taken as the second target pixel, the classifying signals with respect to the second local block consisting of the second target pixel and a plurality of pixels on the periphery of the second target pixel are stored in the second block memory. By using these classifying signals, the mesh feature-amount calculation section calculates the amount of feature of the second target pixel. By using this amount of feature, the mesh judgment section makes a judgment as to whether or not the second target pixel is a pixel belonging to a mesh area. Since the second target pixel is an arbitrary pixel among image signals, each obtained for each pixel by scanning a document, the judgment is made for any pixel of the image signals as to whether it belongs to a mesh area or not.

As described above, after having classified each pixel as to what kind of maximum pixel or minimum pixel it forms, a judgment is made as to whether or not it belongs to a mesh area; therefore, the amount of feature of pixels can be calculated by using only maximum or minimum pixels such as seen in a mesh area so that a mesh area is properly detected.

Consequently, it is possible to increase precision in detecting a mesh area, and also to improve precision in discriminating each area by reducing any erroneous detection on a character area.

For a fuller understanding of the nature and advantages of the invention, reference should be made to the ensuing detailed description taken in conjunction with the accompanying drawings.

BRIEF DESCRIPTION OF THE DRAWINGS

FIG. 9 is an explanatory drawing that shows classifying signals for respective pixels stored in the second block memory.

FIG. 12 is a graph that shows a state in which a character area and a mesh area are separated by using the weighting signals.

DESCRIPTION OF THE EMBODIMENT

Referring to FIGS. 1 through 13, the following description will discuss one embodiment of the present invention.

Figure 1:
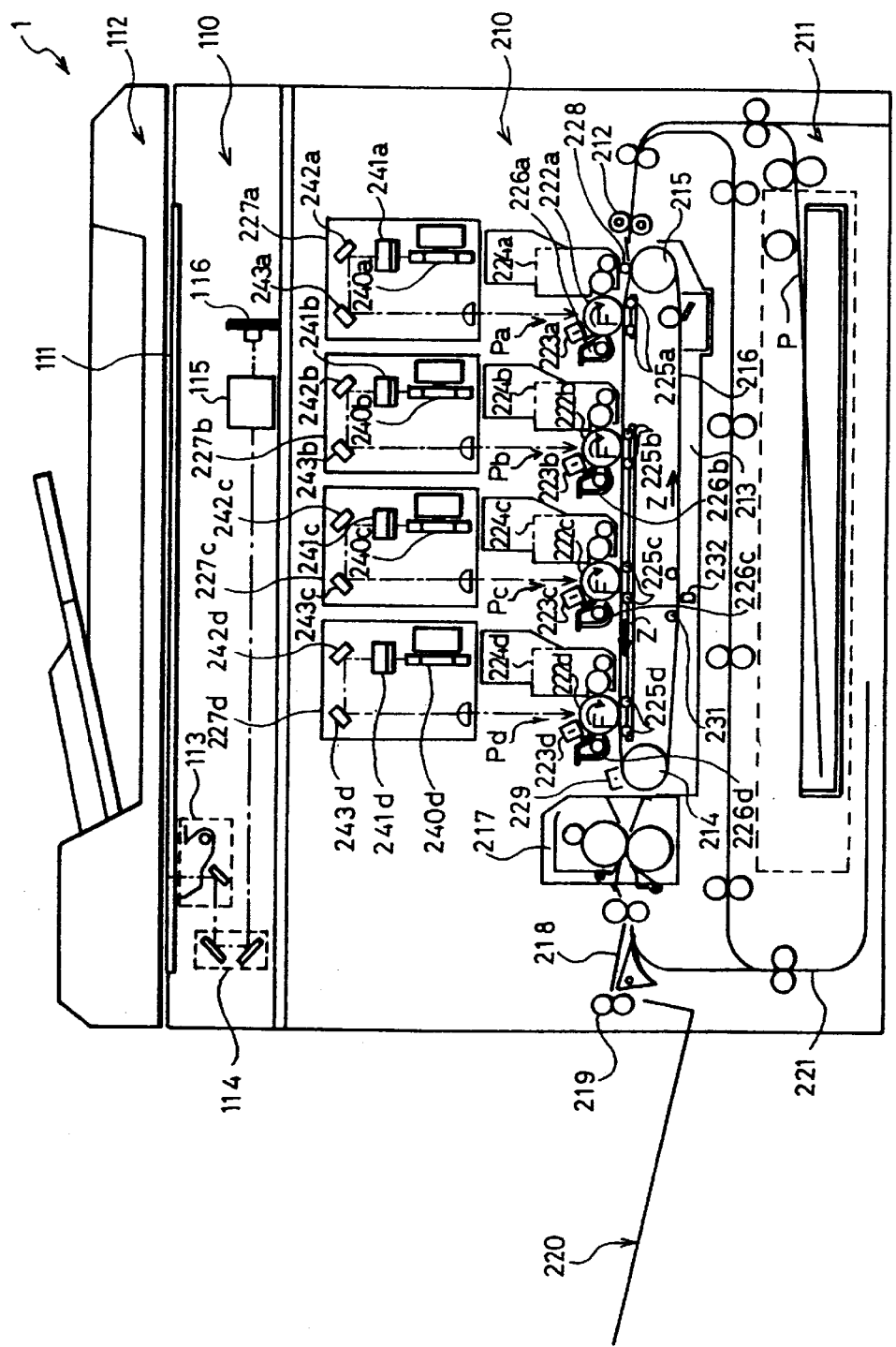
FIG. 1 is a cross-sectional view showing the structure of a digital color image-forming apparatus provided with an image-processing apparatus in accordance with one embodiment of the present invention.

FIG. 1 is a cross-sectional front view that schematically shows the structure of a digital color image-forming apparatus which has an image-processing apparatus of the present embodiment. A document platen 111 and an operation panel (not shown) are installed on the upper face of the image-forming apparatus main body 1, and an image input device 110 and an image output device 210 are installed in the image-forming apparatus main body 1.

On the upper face of the document platen 111 is placed a reversing automatic document feeder (RADF) 112 which is openable with respect to the document platen 111 and has a predetermined positional relationship with the document platen 111. The reversing automatic document feeder 112 first transports a document so as to allow its one face to face the image input device 110 at a predetermined position on the document platen 111. After completion of an image-reading process of an image on this face of the document, it reverses the document and again transports it toward the document platen 111 so as to allow the other face to face the image input device 110 at the predetermined position on the document platen 111. In this manner, after completion of the reading processes of images on the double sides of the document, the reversing automatic document feeder 112 discharges the document, and carries out the double-sided transporting operation on the next document.

The above-mentioned document transporting and reversing operations are controlled in relation to the operation of the entire image-forming apparatus.

The image input device 110 is placed below the document platen 111 so as to read an image of a document transported onto the document platen 111 by the reversing automatic document feeder 112. The image input device 110 includes a scanner section that is constituted by document scanning members 113 and 114 that are reciprocally move in parallel with the lower face of the document platen 111, an optical lens 115 and a CCD (Charge Coupled Device) line sensor 116 that is a photoelectric transfer element.

The document scanning members 113 and 114 consist of a first scanning unit 113 and a second scanning unit 114. The first scanning unit 113, which has an exposure lamp for exposing the surface of a document image and a first mirror for deflecting a reflected light image from the document in a predetermined direction, is allowed to reciprocally move at a predetermined scanning speed in parallel with the lower face of the document platen 111. The second scanning unit 114 has a second mirror and a third mirror that further deflect the reflected light image of the document that has been deflected by the first mirror of the first scanning unit 113 in predetermined directions, and is allowed to reciprocally move in parallel with the first scanning unit 113 in a predetermined speed relationship therewith.

The optical lens 115 is used for reducing the reflected light image of the document deflected by the third mirror of the second scanning unit 114 so as to form an image on a predetermined position on the CCD line sensor 116.

The CCD line sensor 116 photoelectrically transfers the image thus formed from the reflected light image and outputs it as an electric signal. The CCD line sensor 116 is a three-line color CCD that reads a monochrome or color image and outputs line data formed by color-decomposing the image data into respective color components of R(red), G(green) and B(blue). The document image information that has been converted into the electric signal by the CCD line sensor 116, is further transported to an image-processing apparatus, which will be described later, and subjected to predetermined image processes.

Next, an explanation will be given of the construction of the image output device 210 and structures of respective parts related to the image output device 210.

A paper-feed mechanism 211 is placed below the image output device 210. The paper-feed mechanism 211 separates sheets of paper (recording medium) P stored in a paper tray one sheet by one sheet, and supplies it to the image output device 210. The paper P, separated and supplied one sheet by one sheet, is transported to the image output device 210 with its timing being controlled by a pair of registration rollers 212 placed before the image output device 210. Moreover, the paper P, with an image formed on one side thereof, is again supplied and transported to the image output device 210 in synchronized timing with the image formation in the image output device 210.

Below the image output device 210, a transfer conveyor belt mechanism 213 is placed. The transfer conveyor belt mechanism 213 is constituted by a driving roller 214, a driven roller 215 and a transfer conveyor belt 216 that passes over the driving roller 214 and the driven roller 215 in a manner so as to extend between them virtually in parallel; thus, paper P is electrostatically attracted to the transfer conveyor belt 216, and transported. Here, a pattern image detection unit 232 is placed in the vicinity of the lower side of the transfer conveyor belt 216. A pair of tension rollers 231 are installed with the pattern image detection unit 232 located in between. The tension roller 231 forms a flat portion on an opposing face (detection face) of the transfer conveyor belt 216 to the pattern image detection unit 232.

Moreover, on the downstream side of the transfer conveyor belt mechanism 213 in the paper transport path, a fixing device 217 for fixing a toner image transferred and formed on the paper P is installed. The paper P, which has passed through the nip between a pair of fixing rollers constituting the fixing device 217, is transported through a transport-direction switching gate 218, and discharged by a discharging roller 219 onto a paper-receiving tray 220 that is attached to the outer wall of the image-forming apparatus main body 1.

The switching gate 218 selectively switches the transport path of the paper P bearing the fixed toner image either to a path for discharging the paper P outside the image-forming apparatus main body 1 or to a path for re-supplying the paper P toward the image output apparatus 210. The paper P, which has been switched in its transport direction again to the transport path toward the image output device 210 by the switching gate 218, is reversed in its sides through a switch-back transport path 221, and again supplied to the image output device 210.

Above the transfer conveyor belt 216 in the image output device 210, a first image-forming section Pa, a second image-forming section Pb, a third image-forming section Pc and a fourth image-forming section Pd are placed side by side in this order from the upstream side of the paper transport path in the proximity of the transfer conveyor belt 216. The transfer conveyor belt 216, which is driven by a driving roller 214 in the direction indicated by arrow Z in the Figure, supports paper P supplied thereon through the paper-feed mechanism 211 as described earlier and successively transports the paper P to the first through fourth image-forming sections Pa to Pd. The image-forming sections Pa, Pb, Pc and Pd have virtually the same construction, and respectively include photosensitive drums 222a, 222b, 222c and 222d that are driven in the direction of arrow F in FIG. 1.

On the periphery of the photosensitive drums 222a to 222d, there are chargers 223a, 223b, 223c and 223d for charging the respective photosensitive drums 222a to 222d uniformly, developing devices 224a, 224b, 224c and 224d for respectively developing electrostatic latent images formed on the respective photosensitive drums 222a to 222d, transferring members 225a, 225b, 225c and 225d for transferring developed toner images on the photosensitive drums 222a to 222d onto the paper P, and cleaning devices 2226a, 226b, 226c and 226d for removing residual toner on the photosensitive drums 222a to 222d. These members are successively placed in the rotation direction of the respective photosensitive drums 222a to 222d. Moreover, above the photosensitive drums 222a to 222d, laser beam scanner units 227a, 227b, 227c and 227d are respectively installed.

The laser beam scanner units 227a to 227d are provided with semiconductor laser elements (not shown) that emit light rays modulated in accordance with image signals, polygon mirrors (deflection device) 240a, 240b, 240c and 240d for deflecting the laser beams from the semiconductor laser elements in the main scanning direction, f-θ lenses 241a, 241b, 241c and 241d for converging the laser light beams that have been deflected by the polygon mirrors 240a, 240b, 240c and 240d onto respective photosensitive drums 222a to 222d, mirrors 242a, 242b, 242c and 242d, and mirrors 243a, 243b, 243c and 243d.

A pixel signal corresponding to the black component image of a color document image is inputted to the laser beam scanner unit 227a. A pixel signal corresponding to the cyan component of the color document image is inputted to the laser beam scanner unit 227b. A pixel signal corresponding to the magenta component of the color document image is inputted to the laser beam scanner unit 227c. Further, a pixel signal corresponding to the yellow component of the color document image is inputted to the laser beam scanner unit 227d. Consequently, electrostatic latent images corresponding to pieces of document image information thus color-converted are formed on the respective photosensitive drums 222a to 222d.

Moreover, black toner is stored in the developing device 224a, cyan toner is stored in the developing device 224b, magenta toner is stored in the developing device 224c and yellow toner is stored in the developing device 224d, and the electrostatic latent images on the photosensitive drums 222a to 222d are developed by these toners of the respective colors. Thus, the document image information is reproduced as a toner image containing the respective colors in the image output device 210.

Moreover, a paper-attracting charger 228 is installed between the first image-forming section Pa and the paper-feed mechanism 211. The transfer conveyor belt 216 the surface of which has been charged by the paper-attracting charger 228 transports paper P supplied from the paper-feed mechanism 211 from first image-forming section Pa to fourth image-forming section Pd with paper P being firmly attracted thereon, without causing a paper offset.

A static-eliminating device 229 is installed right above the driving roller 214 between the fourth image-forming section Pd and the fixing device 217. An ac voltage is applied to the static-eliminating device 229 so as to separate the paper P electrostatically attracted by the transfer conveyor belt 216 from the transfer conveyor belt 216.

In the digital color image-forming apparatus having the above-mentioned arrangement, paper in the form of cut sheets is used as the paper P. When this sheet of paper P, sent from the paper-feed cassette, is supplied into a guide in the paper-feed transport path of the paper-feed mechanism 211, the leading portion is detected by a sensor (not shown), and it is temporarily stopped by a pair of registration rollers 212 based upon a detection signal outputted from this sensor. Then, the sheet of paper P is sent onto the transfer conveyor belt 216 rotating in the direction of arrow Z in FIG. 1 in synchronized timing with the image-forming sections Pa, Pb, Pc and Pd. At this time, since the transfer conveyor belt 216 has been subjected to a predetermined charge by the attracting charger 228 as described earlier, the sheet of paper P is stably transported and supplied during the passage through the respective image-forming sections Pa to Pd.

In the image-forming sections Pa to Pd, toner images having the respective colors are formed, and the toner images are superposed on the supporting face of the sheet of paper P transported by the transfer conveyor belt 216. Upon completion of the transferring process of the toner image by the fourth image-forming section Pd, the sheet of paper P is separated from the transfer conveyor belt 216 successively from its leading portion by the function of the static-eliminating device 229, and directed to the fixing device 217. Lastly, the sheet of paper P having the toner image fixed thereon is discharged onto the paper-discharge tray 220 from a paper outlet (not shown).

Here, in the above-mentioned explanation, the optical writing processes onto the photosensitive members are carried out by scanning and exposing them with laser beams by means of the respective laser beam scanner units 227a to 227d. However, in lieu of the laser beam scanner units 227a to 227d, a writing optical system (LED (Light Emitting Diode) head) consisting of a light-emitting diode array and an image-converging lens array may be adopted. The LED head is smaller in size as compared with the laser beam scanner units 227a to 227d, and has no moving sections, consequently causing no noise; therefore, it is more preferably used in digital color image-forming apparatuses of the tandem system, etc., that require a plurality of optical writing units.

Figure 2:
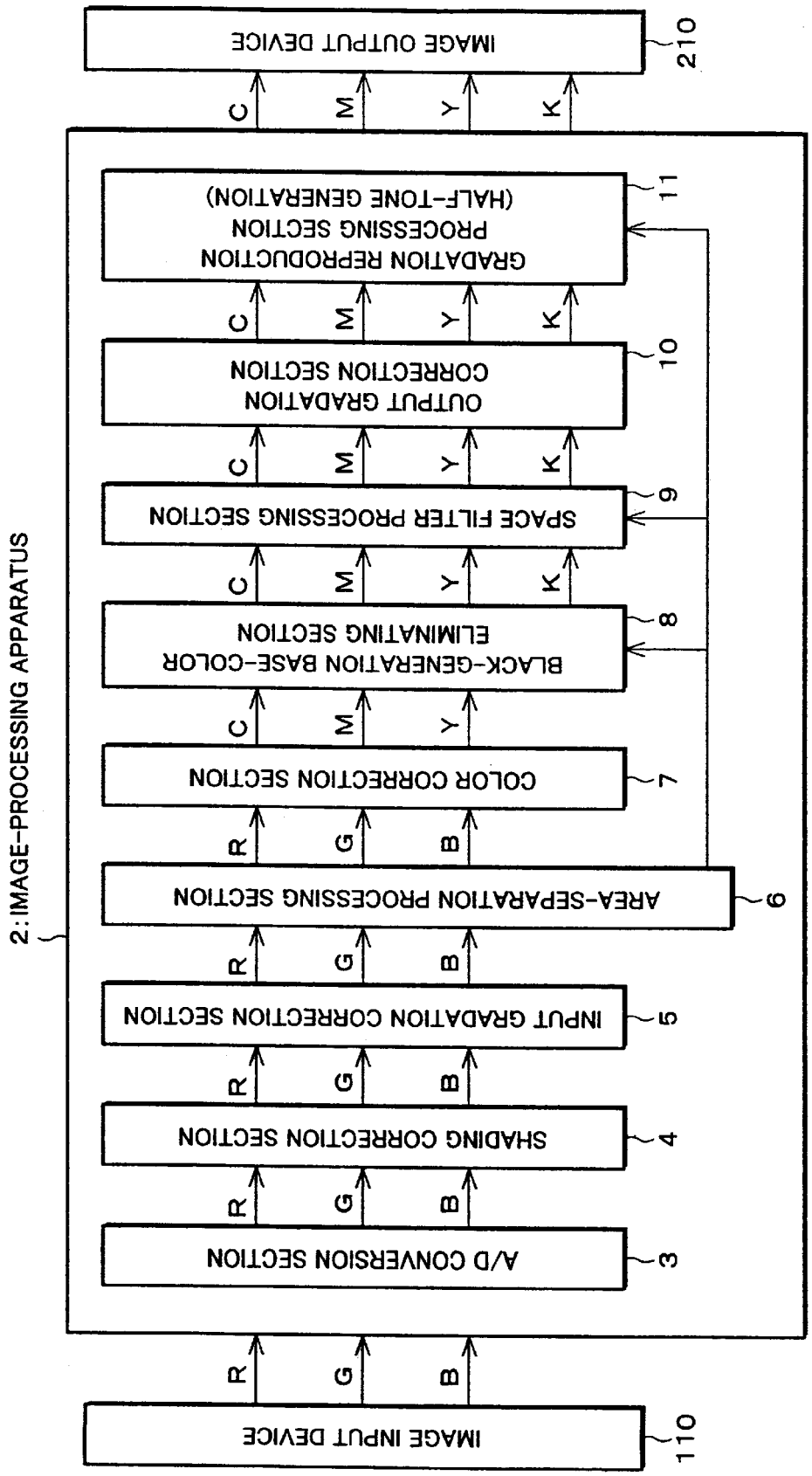
FIG. 2 is a block diagram that shows the construction of the image-processing apparatus.

FIG. 2 shows the structure of an image-processing apparatus 2. The image input device 110 is constituted by the aforementioned scanner sections, and light images RGB (R: red, G: green and B: blue) reflected from a document are read by the CCD line sensor 116 as analog signals, and inputted to the image-processing apparatus 2.

The RGB analog signals, inputted to the image-processing apparatus 2, are first converted into digital signals by an A/D (analog to digital) conversion section 3, and these are subjected to processes for removing various distortions caused by the illuminating system, image-converging system and image-pick-up system in the image-input device 110 by a shading correction section 4.

Thereafter, an input gradation correction processing section 5 carries out processes on reflection rate signals of RGB so as to adjust color balance thereof and to convert them into signals (density signals, etc.) that are easily handled by the image-processing system.

Next, in an area-separation processing section (which will be described later in detail) 6, the input signal thereto is separated so that with respect to a document having mixed areas of character, photograph and mesh areas, separation processes of these areas are carried out. Discrimination signals for the respective areas are outputted to a black-generation base-color eliminating section 8, a space filter processing section 9 and a gradation reproduction processing section 11. Moreover, the original input signal, as it is, is outputted to a color correction section 7 placed in the following stage.

In the color correction section 7, in order to achieve superior fidelity in color reproduction, a process for eliminating color turbidity is carried out based upon spectral characteristics of CMY (C: cyan, M: magenta, Y: yellow) color materials including unnecessary absorbing components. Then, in the black-generation base-color eliminating section 8, a black generation process for generating a black (K) signal from a three-color signal of CMY after the color correction, and a process for generating a new CMY signal by subtracting the K signal obtained by the black generation from the original CMY signal is carried out so that the CMY three-color signal is converted into a four-color signal of CMYK.

Next, in the space filter processing section 9, a space filter process is carried out on the resulting image signal by using a digital filter; thus, the process prevents fog and degradation in granularity in the output image by correcting spatial frequency characteristics.

With respect to an image area that is determined to be a character area by the area-separation processing section 6, in order to improve reproducibility of, especially, black characters or color characters, the amount of emphasis of the high-band frequencies is increased in a sharpness emphasizing process of the space filter processing section 9. Simultaneously, in the gradation reproduction processing section 11, a binarizing or multi-value process for a high-resolution screen suitable for reproducing high-band frequencies is selected.

With respect to an area that is discriminated to be a mesh area by the area-separation processing section 6, an appropriate process for eliminating moire, such as a low-pass filter process, is carried out. Moreover, in the output gradation correction section 10, an output gradation correction process, which converts signals such as a density signal into a mesh area rate that is a characteristic value of each of the image-forming sections Pa, Pb, Pc and Pd, is carried out, and lastly, the image is divided into pixels in the gradation reproduction processing section 11, a gradation reproducing process (half-tone generation) for allowing the respective pixels to reproduce their gradations is carried out.

With respect to an image area that is determined as a photograph area by the area-separation processing section 6, a binarizing or multi-value process for a screen which emphasizes the gradation reproducibility is carried out.

The image signal, which has been subjected to the above-mentioned respective processes, is temporarily stored in a storage means, read out with a predetermined timing and inputted to the image output device 210. The image output device 210 is output an image signal onto a recording medium (for example, paper, etc.), and examples thereof include monocolor and color image output apparatuses, etc. using the electrophotographing system and ink-jet system; however, the present invention is not intended to be limited thereby.

Next, referring to FIGS. 3 through 13, the following description will discuss one embodiment of the area separation processing section 6 in the image-processing apparatus 2.

Figure 3:
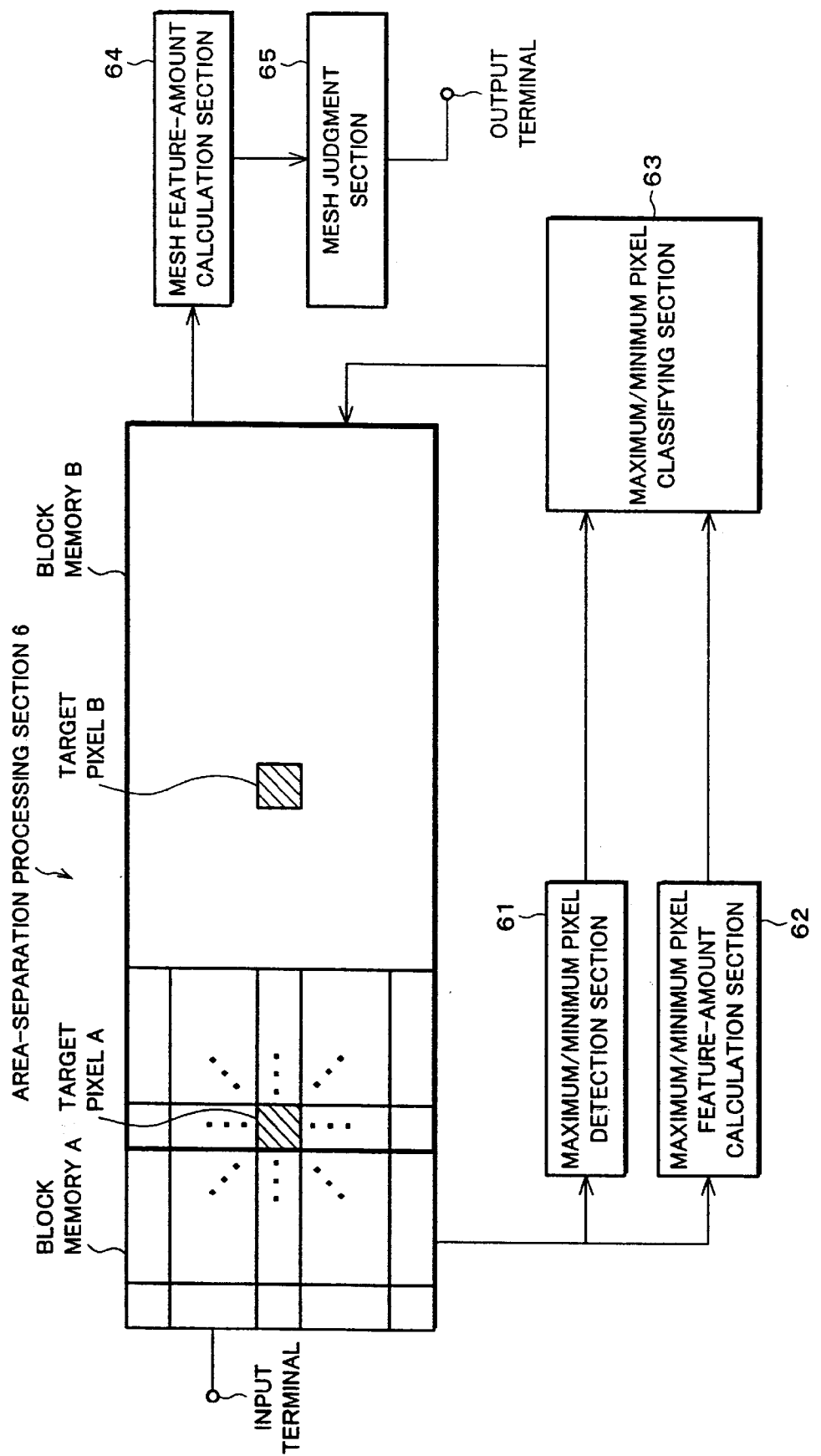
FIG. 3 is a block diagram that shows the construction of an area-separation processing section that is installed in the image-processing apparatus.

As illustrated in FIG. 3, the area separation processing section 6 is provided with an input terminal, a block memory A (first block memory), a maximum/minimum pixel detection section (maximum/minimum pixel detection means) 61, a maximum/minimum pixel feature-amount calculation section (maximum/minimum pixel feature-amount calculation means) 62, a maximum/minimum pixel classifying section (maximum/minimum pixel classifying means) 63, a block memory B (second block memory), a mesh feature-amount calculation section (mesh feature-amount calculation means) 64, a mesh judgement section (mesh judgement means) 65 and an output terminal.

The above-mentioned block memory A ($M_1 \times N_1$, where $M_1$ and $N_1$ are arbitrary integers with $M_1>1$, $N_1>1$) is provided with a storing area which stores image signals corresponding to a plurality of lines inputted from the input terminal at 256 levels (8 bits) for each pixel, and the storing area stores image signals of a first local block consisting of a target pixel A (first target pixel) and a plurality of pixels in the proximity thereof.

The maximum/minimum pixel detection section 61 outputs a discrimination signal for discriminating whether the density value of a target pixel A forms a maximum point or a minimum point within the first local block, from the image signals stored in the block memory A.

With respect to pixels extending from the target pixel A in the main-scanning direction, sub-scanning direction or diagonal direction, the maximum/minimum pixel feature-amount calculation section 62 calculates and outputs density gradient information, for example, the number of continuous pixels, that is, the number of continuous peripheral pixels having the same density value as that of the target pixel A, and the sum of absolute values of density differences between the target pixel A and the peripheral pixels in the number of continuous pixels, by using the image signals stored in the block memory A. Hereinafter, the number of continuous pixels is referred to as "runlength".

The maximum/minimum pixel classifying section 63 outputs the following classifying signals with respect to the target pixel A by using the discrimination signal outputted from the maximum/minimum pixel detection section 61 and the output of information from the maximum/minimum pixel feature-amount calculation section 62.

Classifying signal 0: Non-maximum or non-minimum pixel

Classifying signal 1: Maximum or minimum pixel seen mostly in a character area

Classifying signal 3: Maximum or minimum pixel seen mostly in a mesh area

Classifying signal 2: Maximum or minimum pixel belonging to neither the classifying signal 1 nor the classifying signal 3

Here, the above-mentioned block memory B ($M_2 \times N_2$, where $M_2$ and $N_2$ are arbitrary integers with $M_2>1$, $N_2>1$) is provided with a storing area which stores image signals corresponding to a plurality of lines inputted from the maximum/minimum pixel classifying section 63, and this storing area stores image signals of a second local block consisting of a target pixel B (second target pixel) and a plurality of pixels in the proximity thereof. Here, the storing area of the block memory B is set so as to be equal to the block memory A or greater than the block memory A.

The mesh feature-amount calculation section 64 calculates the amount of feature of the target pixel B based upon feature parameters indicating the characteristics of the mesh area, by using the classifying signals stored in the block memory B, and outputs the amount of feature.

The mesh judgement section 65 outputs a discrimination signal for discriminating whether or not the target pixel B is a pixel located in a mesh area based upon the output signal of the mesh feature-amount calculation section 64.

Figure 4:
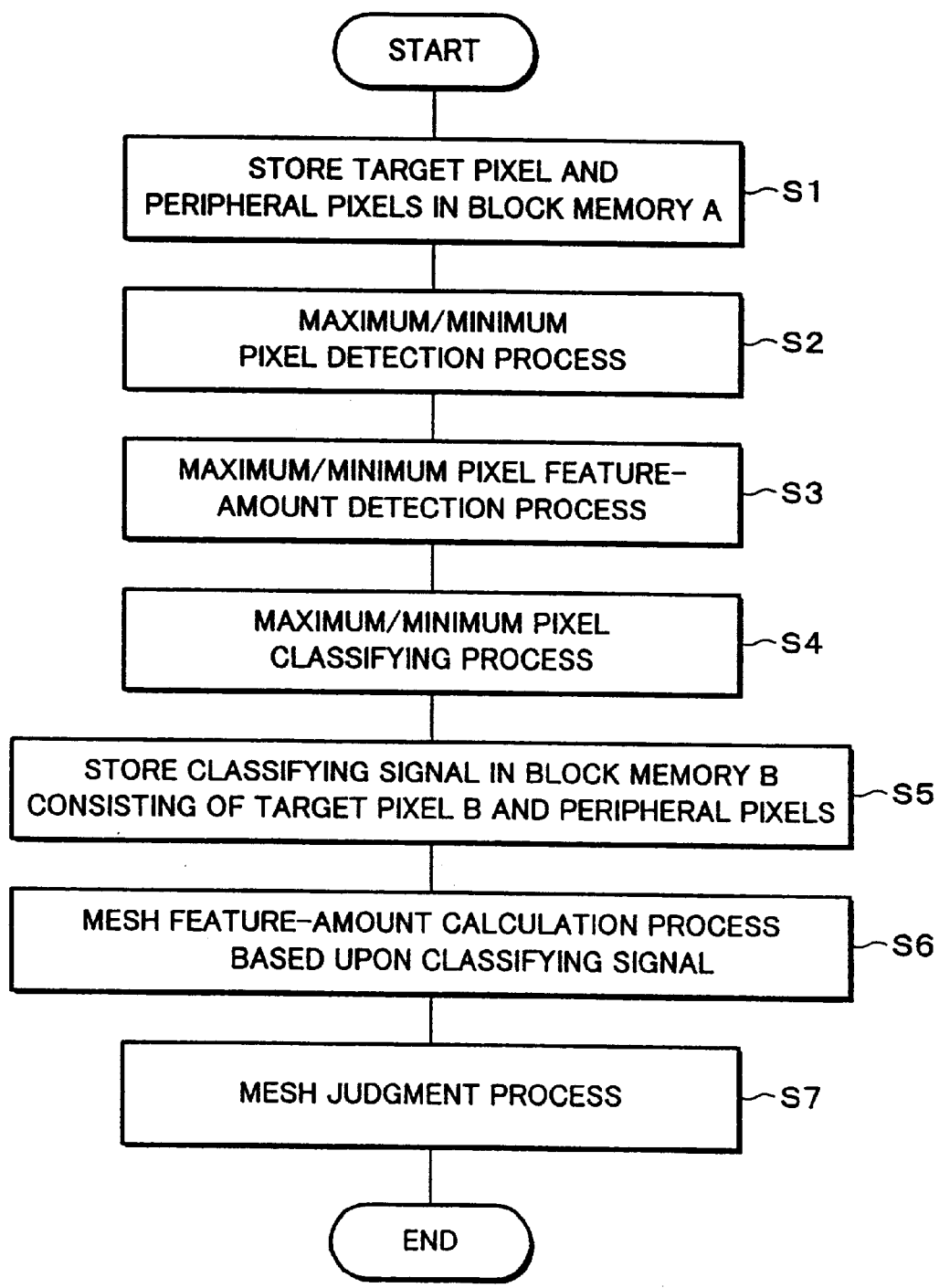
FIG. 4 is a flow chart showing an image-processing method in the area-separation processing section.

FIG. 4 is a flow chart that shows the sequence of the area discriminating process of an image that is carried out in the above-mentioned arrangement. An image signal, obtained by allowing the image input device 110 that forms an image reading section containing a CCD image sensor to scan a document, is subjected to the predetermined processes in the A/D conversion section 3, shading correction section 4 and input gradation correction section 5 as described earlier, and inputted to the area-separation processing section 6. In the area-separation processing section 6, at step 1 (hereinafter, step is indicated by "S"), an image signal (first local block centered on a target pixel A) in a local block consisting of the target pixel A and pixels in the periphery thereof is stored in the block memory A shown in FIG. 3.

At S2, the maximum/minimum pixel detection section 61 uses the image signals in the first local block stored in the block memory A and carries out a maximum/minimum pixel detection process for discriminating whether the target pixel A is a maximum pixel or a minimum pixel within the first local block.

At S3, the maximum/minimum pixel feature-amount calculation section 62 carries out a maximum/minimum pixel feature-amount calculating process in which density gradient information of pixels extending from the target pixel A in the main scanning direction, sub-scanning direction or diagonal direction, such as, for example, the runlength and the sum of absolute values of density differences between the target pixel A and the peripheral pixels, as described above.

At S4, the maximum/minimum pixel classifying section 63 uses the results of the maximum/minimum pixel detection process and the maximum/minimum pixel feature-amount calculating process, and carries out a maximum/minimum pixel classifying process in which, with respect to the target pixel A, a classifying signal is outputted so as to indicate whether it is a maximum pixel or a minimum pixel, or what characteristic the maximum pixel or the minimum pixel has, if any.

At S5, the classifying signal that has been obtained in S4 and is a classifying signal related to a second local block consisting of a target pixel B and peripheral pixels of the target pixel B is stored in the block memory B.

At S6, the mesh feature-amount calculation section 64 uses the classifying signal stored in the block memory B so as to carry out a mesh feature-amount calculation process for calculating the amount of feature based upon feature parameters indicating the characteristics of the mesh area, by using the classifying signals stored in the block memory B.

At S7, the mesh judgement section 65 uses the respective amounts of feature calculated in S6 so as to carry out a mesh judgment process with respect to the target pixel B, and outputs a discrimination signal for discriminating whether or not the target pixel B is a pixel located in a mesh area.

Next, a detailed explanation will be given of the above-mentioned constituent elements forming the area-separation processing section 6.

First, referring to FIG. 5, a detailed explanation will be given of the construction of the maximum/minimum pixel detection section 61. The maximum/minimum pixel detection section 61 uses a maximum/minimum pixel detecting block a for dealing with high-density mesh points and a maximum/minimum pixel detecting block b for dealing with low-density mesh points, as a block memory A. In other words, the two kinds of first local blocks, that is, the maximum/minimum pixel detecting block a ($m_1 \times n_1$, where $m_1$ and $n_1$ are arbitrary integers with $m_1>1$, $n_1>1$) and the maximum/minimum pixel detecting block b ($m_2 \times n_2$, where $m_2$ and $n_2$ are arbitrary integers with $m_2>1$, $n_2>1$), are used so as to detect a maximum/minimum pixel. Here, $m_2>m_1$ and $n_2>n_1$ are satisfied. The maximum/minimum pixel detection section 61 is constituted by a first maximum/minimum pixel detection section 61a for detecting a maximum/minimum pixel with respect to the maximum/minimum pixel detecting block a and a second maximum/minimum pixel detection section 61b for detecting a maximum/minimum pixel with respect to the maximum/minimum pixel detecting block b.

Here, in the present embodiment, the two kinds of the first local blocks (the maximum/minimum pixel detecting block a and the maximum/minimum pixel detecting block b) are used; however, it is possible to use three kinds or more of the first local blocks having different desired sizes so as to deal with various mesh points ranging from high density to low density.

In the case when a target pixel A is a maximum pixel or a minimum pixel within the respective first local blocks, it is considered that, in general, the target pixel A has the following features (1) through (4).

(1) The density value P of the target pixel A is greater or smaller than the average density value AVE of pixels located within the respective first local blocks.

(2) The density value P of the target pixel A is greater or smaller than the density value Pij of any one of the peripheral pixels. In other words, with respect to the peripheral pixels, P≦Pij or P≧Pij are satisfied.

(3) The number of peripheral pixels having a density value equal to the density value P of the target pixel A is relatively small.

(4) The sum of the absolute values of the differences between the density value P of the target pixel A and the density values Pij of the peripheral pixels is great.

In the case when all the conditions of (1) through (4) are satisfied, it is highly possible that the target pixel A is a maximum pixel or a minimum pixel. Based upon this idea, the maximum/minimum pixel detection section 61 makes a judgment as to whether a target pixel A in question is a maximum or minimum pixel.

Figure 5:
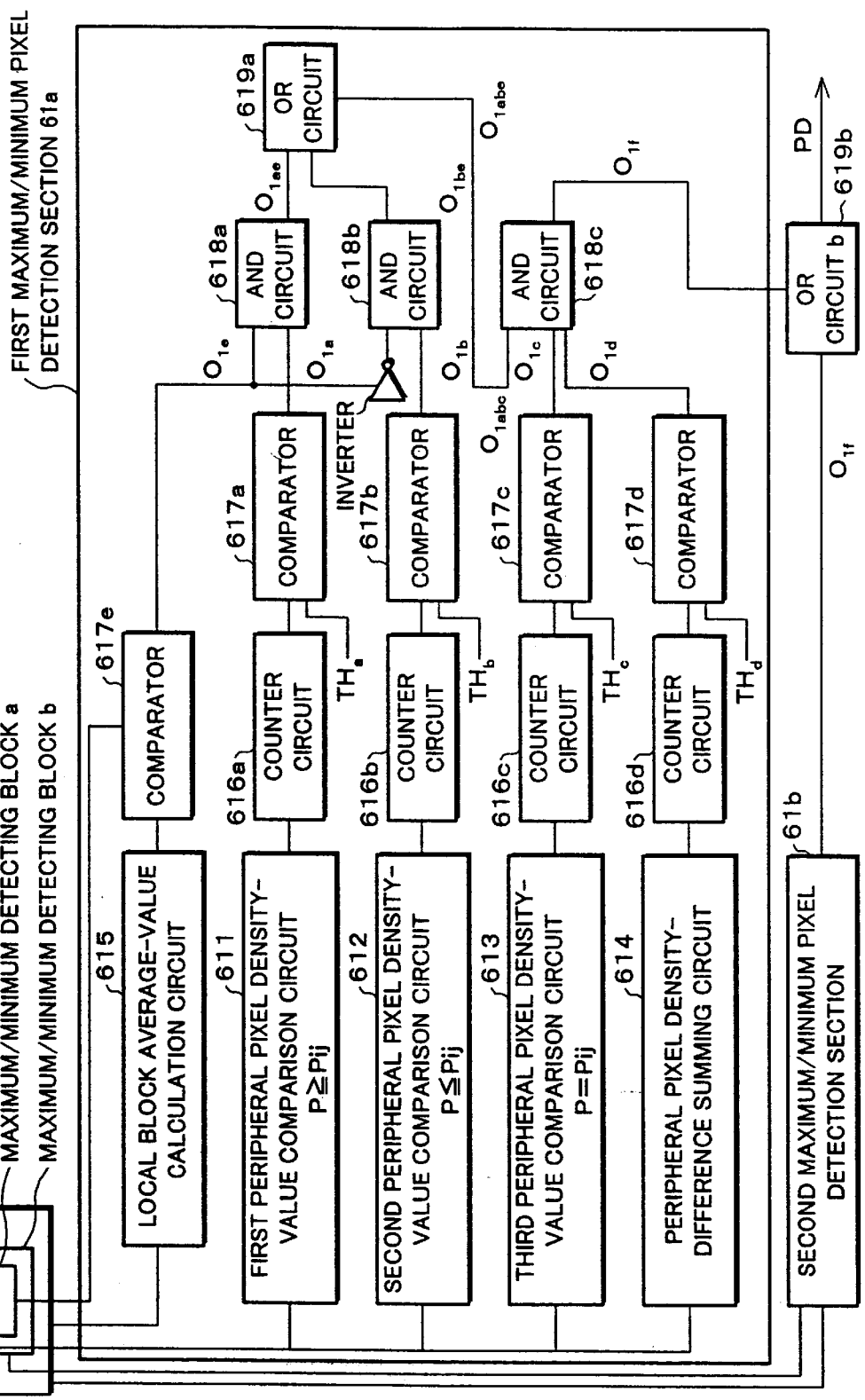
FIG. 5 is an explanatory drawing that shows the construction of a maximum/minimum pixel detection section that constitutes the area-separation section.

As illustrated in FIG. 5, a first peripheral pixel density-value comparison circuit 611, which constitutes the first maximum/minimum pixel detection section 61a, compares the density value P of a target pixel A with the density values Pij of the peripheral pixels in the maximum/minimum pixel detecting block a, and outputs a discrimination signal (density-comparison result) for discriminating whether or not P≦Pij is satisfied.

The discrimination signal outputted from the first peripheral pixel density-value comparison circuit 611 is inputted to a count circuit 616a. Based upon the discrimination signal, the count circuit 616a counts the number of the peripheral pixels $NP_a$ that satisfy $P \leq P_{ij}$. The number of the peripheral pixels $NP_a$ that satisfy $P \leq P_{ij}$ and have been counted by the count circuit 616a are compared with a threshold value $TH_a$ in a comparator 617a. When $NP_a > TH_a$ is satisfied, an output signal $O_{1a}$ having a discrimination value "1" is outputted, while when $NP_a > TH_a$ is not satisfied, the output signal $O_{1a}$ having a discrimination value "0" is outputted.

A second peripheral pixel density-value comparison circuit 612 compares the density value P of a target pixel A with the density values Pij of the peripheral pixels in the maximum/minimum pixel detecting block a, and outputs a discrimination signal (density-comparison result) for discriminating whether or not P≦Pij is satisfied.

The discrimination signal outputted from the second peripheral pixel density-value comparison circuit 612 is inputted to a count circuit 616b. Based upon the discrimination signal, the count circuit 616b counts the number of the peripheral pixels $NP_b$ that satisfy $P \leq P_{ij}$. The number of the peripheral pixels $NP_b$ that satisfy $P \leq P_{ij}$ and have been counted by the count circuit 616b are compared with a threshold value $TH_b$ in a comparator 617b. When $NP_b > TH_b$ is satisfied, an output signal $O_{1b}$ having a discrimination value "1" is outputted, while when $NP_b > TH_b$ is not satisfied, the output signal $O_{1b}$ having a discrimination value "0" is outputted.

Here, supposing that the number of pixels in the maximum/minimum pixel detecting block a is N, a value N−2, which is smaller than N by 2, is for example used as the threshold values $TH_a$ and $TH_b$.

A third peripheral pixel density-value comparison circuit 613 compares the density value P of a target pixel A with the density values Pij of the peripheral pixels in the maximum/minimum pixel detecting block a, and outputs a discrimination signal for discriminating whether or not P=Pij is satisfied.

The discrimination signal outputted from the third peripheral pixel density-value comparison circuit 613 is inputted to a count circuit 616c. Based upon the discrimination signal, the count circuit 616c counts the number of the peripheral pixels $NP_c$ that satisfy $P = P_{ij}$ (sum of pixels having the same density). The number of the peripheral pixels $NP_c$ that satisfy $P = P_{ij}$ and have been counted by the count circuit 616c are compared with a threshold value $TH_c$ in a comparator 617c. When $NP_c < TH_c$ is satisfied, an output signal $O_{1c}$ having a discrimination value "1" is outputted, while when $NP_c < TH_c$ is not satisfied, the output signal $O_{1c}$ having a discrimination value "0" is outputted.

With respect to the threshold value $TH_c$, in the case when the maximum/minimum pixel detecting block a has a size of 3×3, for example, 3 is applied as the threshold value $TH_c$, by taking into consideration the number of pixels that deal with high-density mesh points. In the case when the maximum/minimum pixel detecting block b has a size of 5×3, 5 is applied as the threshold value $TH_c$, by taking into consideration the number of pixels that deal with low-density mesh points.

A peripheral pixel density-difference summing circuit 614 calculates the sum (density-difference sum; hereinafter, referred to as PS) of the absolute values between the density value P of a target pixel A and the peripheral pixel density values Pij in the maximum/minimum pixel detecting block a, that is, $PS = \Sigma |P - Pij|$. PS, calculated by the peripheral pixel density-difference summing circuit 614, is compared with a threshold value $TH_d$ in a comparator 617d. When $PS > TH_d$ is satisfied, an output signal $O_{1d}$ having a discrimination value "1" is outputted, while when $PS > TH_d$ is not satisfied, the output signal $O_{1d}$ having a discrimination value "0" is outputted.

With respect to the threshold value $TH_d$, a value that enables a discrimination between a PS value found in a mesh area and a PS value found in a base area is applied. Data are preliminarily collected for various images, and based upon the results thereof, this value may be set.

A local block average-value calculation circuit 615 calculates the average value AVE (density average value) of pixel density values in the maximum/minimum pixel detecting block memory A. The average value AVE of the pixel density values, outputted from the local block average-value calculation circuit 615, is compared with the density value P of the target pixel A in a comparator 617e. When P>AVE is satisfied, an output signal $O_{1e}$ having a discrimination value "1" is outputted, while when P>AVE is not satisfied, the output signal $O_{1e}$ having a discrimination value "0" is outputted.

Next, the following description will discuss a means for making a judgment as to whether the target pixel A is a maximum value or a minimum value by using the output signals $O_{1a}$, $O_{1b}$, $O_{1c}$, $O_{1d}$ and $O_{1e}$.

First, an AND circuit 618a finds a logical product $O_{1ae}$ between the output signal $O_{1a}$ and the output signal $O_{1e}$. When this logical product $O_{1ae}$ satisfies $O_{1ae}=1$, the density value P of the target pixel A is higher than the average density value AVE of the pixels inside the first local block, and the number of peripheral pixels having densities lower than the density value P of the target pixel A is greater than a predetermined value. Therefore, the resulting judgment is that it is highly possible that the target pixel A is a maximum pixel.

An AND circuit 618b finds a logical product $O_{1be}$ between the output signal $O_{1b}$ and an inverted signal obtained by inverting the output signal $O_{1e}$ using an inverter. In the case when this logical product $O_{1be}$ satisfies $O_{1be}=1$, different from the logical product $O_{1ae}$, the resulting judgment is that it is highly possible that the target pixel A is a minimum pixel.

An OR circuit 619a finds a logical OR $O_{1abe}$ from the logical product $O_{1ae}$ and the logical product $O_{1be}$, and in the case when it is highly possible that the target pixel A is a maximum pixel or a minimum pixel, the logical OR $O_{1abc}=1$ is outputted.

An AND circuit 618c finds a logical product $O_{1f}$ of the logical OR $O_{1abc}$, the output signal $O_{1c}$ and the output signal $O_{1d}$. Here, when the target pixel A is a maximum value or a minimum value, "1" is outputted from the first maximum/minimum pixel detection section 61a, and when the target pixel A is neither a maximum pixel nor a minimum pixel (non-maximum or non-minimum pixel), "0" is outputted therefrom.

Moreover, in the case when a plurality of maximum/minimum pixel detecting blocks are used so as to deal with various kinds of meshes, that is, in the case when the maximum/minimum pixel detecting block b is also used in addition to the maximum/minimum pixel detecting block a as in the case of the present embodiment, the same process as that of the maximum/minimum pixel detecting block a is carried out on the maximum/minimum pixel detecting block b by using the second maximum/minimum pixel detection section 61b so that a logical product $O_{1f}$ is obtained. Here, the construction of the second maximum/minimum pixel detection section 61b is the same as the first maximum/minimum pixel detection section 61a.

In the case when the target pixel A is a maximum value or a minimum value, the logical OR of the maximum/minimum detecting blocks a and b, obtained in an OR circuit 619b, becomes "1" by using the logical product $O_{1f}$ from the first maximum/minimum pixel detection section 61a and the logical product $O_{1f}$ from the second maximum/minimum pixel detection section 61b, and a discrimination signal PD indicating this value is outputted from the maximum/minimum pixel detection section 61. In contrast, in the case when the target pixel A is neither a maximum value nor a minimum value, the logical OR becomes "0" and a discrimination signal PD indicating this value is outputted therefrom.

Here, in the case when a plurality of maximum/minimum pixel detecting blocks are not used, that is, only the maximum/minimum pixel detecting block a is used, the logical product $O_{1f}$, released from the first maximum/minimum pixel detection section 61a, is outputted from the maximum/minimum pixel detection section 61 as the discrimination signal PD.

Next, the maximum/minimum pixel feature-amount calculation section 62 finds the amount of feature of the maximum pixel and minimum pixel. The maximum/minimum pixel feature-amount calculation section 62 finds information of peripheral pixels surrounding the target pixel A, that is, information as to what distribution the densities of the peripheral pixels have. In this case, with respect to the feature parameters to be used, the runlength of the peripheral pixels having the same density value as the density value of the target pixel A and the sum of the absolute values of differences between the density value of the target pixel A and the density values of the peripheral pixels in the runlength are used.

Figure 6:
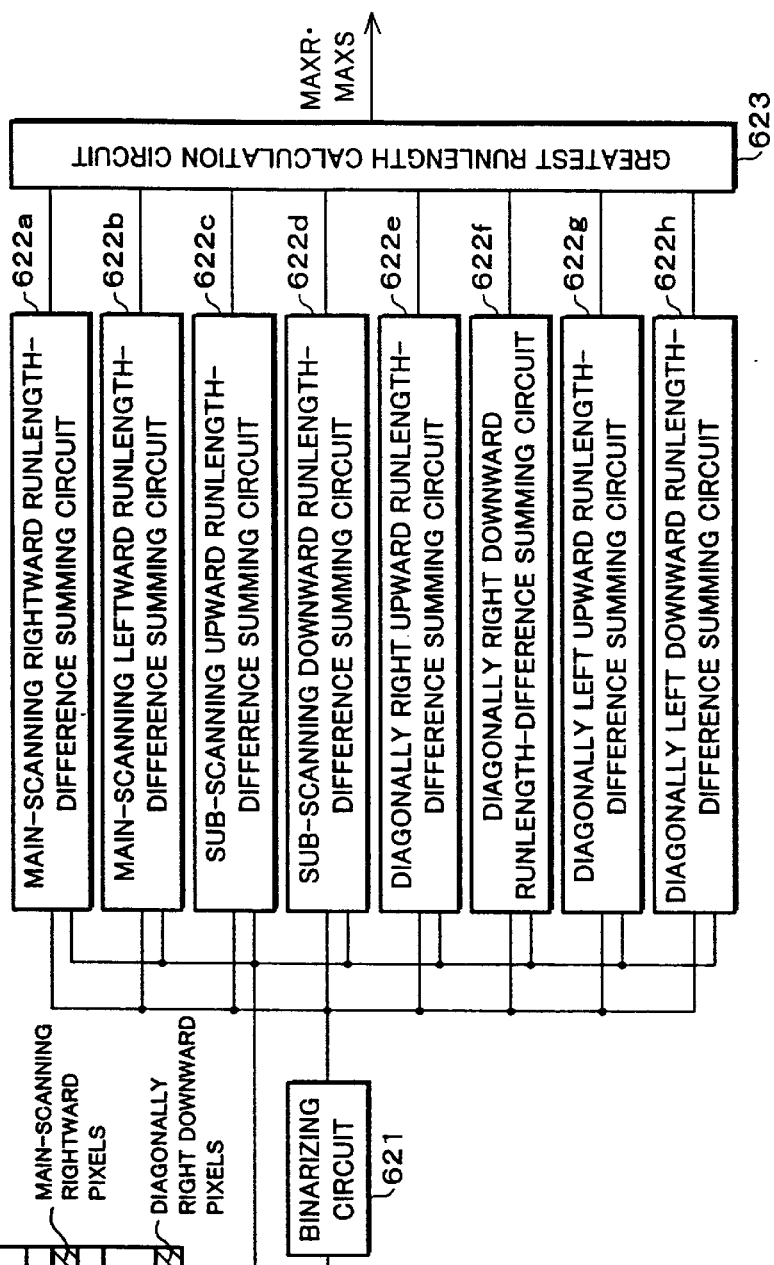
FIG. 6 is an explanatory drawing that shows the construction of a maximum/minimum pixel feature-amount calculation section that constitutes the area-separation section.
Figure 7:
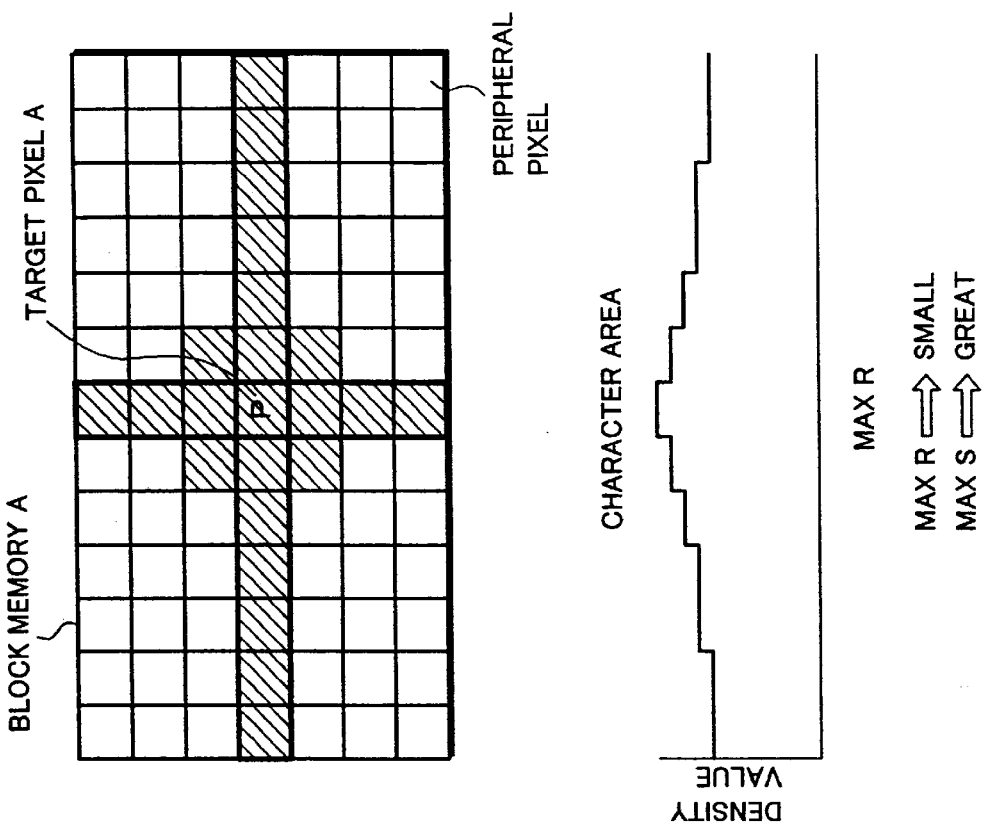
FIG. 7($a$) is an explanatory drawing that shows the amount of feature calculated by the maximum/minimum pixel feature-amount calculation section in a mesh area, and FIG. 7($b$) is an explanatory drawing that shows the amount of feature calculated by the maximum/minimum pixel feature-amount calculation section in a character area.
Figure 7:
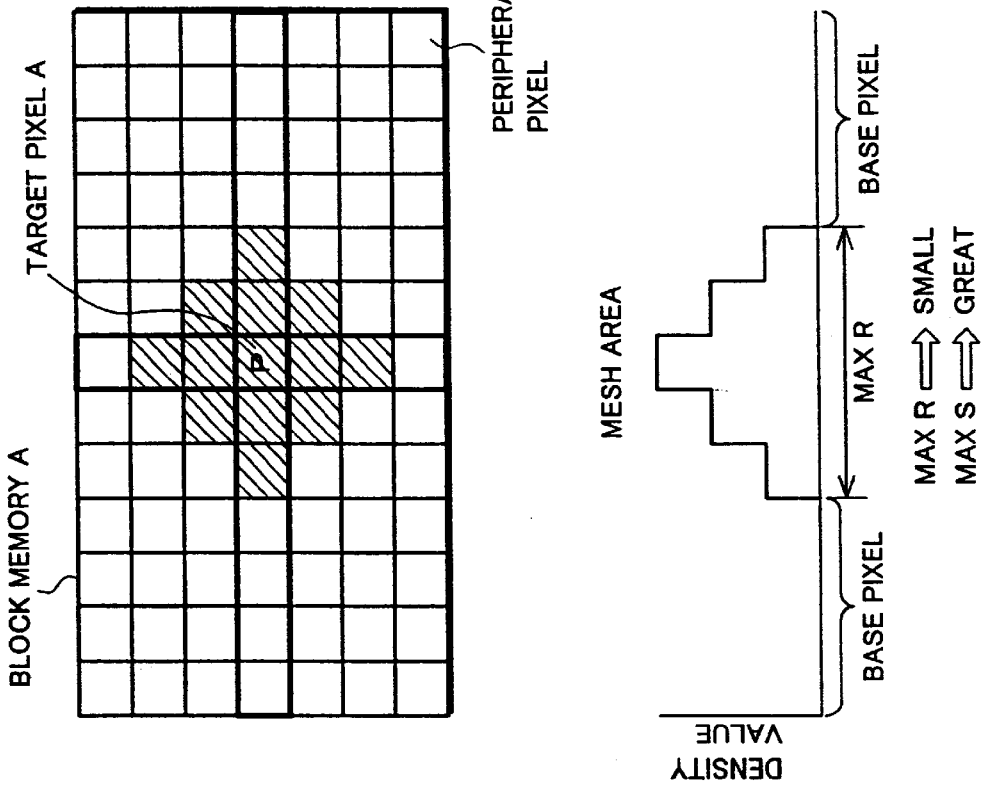

FIG. 6 shows the construction of the maximum/minimum pixel feature-amount calculation section 62. The maximum/minimum pixel feature-amount calculation section 62 is provided with a binarizing circuit (binarizing means) 621, runlength-difference summing circuits (continuous pixel calculation means, diagonal-direction continuous pixel calculation means) 622a through 622h related to pixels extending from the target pixel A in respective directions, and a greatest runlength calculation circuit 623.

In the above-mentioned binarizing circuit 621, a binarizing process is carried out on the respective pixels of the block memory A by using a predetermined threshold value, that is, for example, a value obtained by adjusting the average value of the pixel density values in the block memory A (a value adjusted so as to have a slight width with respect to the average value of the pixel density values). In other words, when the density value P of the target pixel A is greater than the predetermined threshold value, a discrimination signal "1" is outputted, and when the density value P of the target pixel A is not more than the predetermined threshold value, a discrimination signal "0" is outputted.

The output of the binarizing circuit 621 with respect to the density value P of the target pixel A is designated as BP, and the output corresponding to each of the density values Pij of the peripheral pixels is designated as BPij.

A 1-bit signal from the binarizing circuit 621 and a 8-bit signal from the block memory A are inputted to the runlength-difference summing circuits 622a through 622h. Alternatively, instead of installing the binarizing circuit 621, a comparator may be placed so as to set a threshold value, thereby classifying and processing the 8-bit input signal from the block memory A.

The runlength-difference summing circuit (continuous pixel calculation means, density difference summing means) 622a related to the main scanning right-side direction calculates a runlength $R_{mr}$ that satisfies BP=BPij in the right direction from the target pixel A with respect to pixels aligned in the main scanning right-side direction shown in FIG. 6, and with respect to the runlength $R_{mr}$, the sum of the absolute values of differences between the density value of the target pixel A and the density values of the peripheral pixels (sum of density differences in the main scanning direction), $S_{mr}=\Sigma|P-Pij|$, is found.

Moreover, the runlength-difference summing circuit (continuous pixel calculation means, density difference summing means) 622b related to the main scanning left direction calculates a runlength $R_{ml}$ that satisfies BP=BPij in the left direction from the target pixel A with respect to pixels aligned in the main scanning left direction shown in FIG. 6, and with respect to the runlength $R_{ml}$, the sum of the absolute values of differences between the density value of the target pixel A and the density values of the peripheral pixels (sum of density differences in the main scanning direction), $S_{ml}=\Sigma|P-Pij|$, is found.

In the same manner, the following values are obtained: In the runlength-difference summing circuit (continuous pixel calculation means, density difference summing means) 622c related to the sub scanning upward direction, with respect to pixels aligned in the sub scanning upward direction, the sum of the absolute values of density differences in the runlength $R_{su}$, $S_{su}=\Sigma|P-Pij|$, is found; in the runlength-difference summing circuit (continuous pixel calculation means, density difference summing means) 622d related to the sub scanning downward direction, with respect to pixels aligned in the sub scanning downward direction, the sum of the absolute values of density differences in the runlength $R_{sd}$, $S_{sd}=\Sigma|P-Pij|$, is found; in the runlength-difference summing circuit (continuous pixel calculation means, diagonal direction density difference summing means) 622e related to the sub scanning diagonally right-upward direction, with respect to pixels aligned in the sub scanning diagonally right-upward direction, the sum of the absolute values of density differences in the runlength $R_{ru}$, $S_{ru}=\Sigma|P-Pij|$, is found; in the runlength-difference summing circuit (continuous pixel calculation means, diagonal direction density difference summing means) 622f related to the sub scanning diagonally right-downward direction, with respect to pixels aligned in the sub scanning diagonally right-downward direction, the sum of the absolute values of density differences in the runlength $R_{rd}$, $S_{rd}=\Sigma|P-Pij|$, is found; in the runlength-difference summing circuit (continuous pixel calculation means, diagonal direction density difference summing means) 622g related to the sub scanning diagonally left-upward direction, with respect to pixels aligned in the sub scanning diagonally left-upward direction, the sum of the absolute values of density differences in the runlength $R_{lu}$, $S_{lu}=\Sigma|P-Pij|$, is found; and in the runlength-difference summing circuit (continuous pixel calculation means, diagonal direction density difference summing means) 622h related to the sub scanning diagonally left-downward direction, with respect to pixels aligned in the sub scanning diagonally left-downward direction, the sum of the absolute values of density differences in the runlength $R_{ld}$, $S_{ld}=\Sigma|P-Pij|$, is found.

From the greatest runlength calculation circuit 623, the maximum value MAXR of the runlengths $R_{mr}$, $R_{ml}$, $R_{su}$, $R_{sd}$, $R_{ru}$, $R_{rd}$, $R_{lu}$, and $R_{ld}$ outputted from the runlength-difference summing circuits 622a to 622h and the sum of the absolute values MAXS of differences in densities of pixels in a direction which makes the runlength maximum are outputted.

Here, the greatest value MAXR and the sum MAXS of the absolute values of the differences may be found only in the main-scanning direction and sub-scanning direction in FIG. 6.

Referring to FIGS. 7(a) and 7(b), with respect to a mesh area and a character area, an explanation will be given of characteristics indicated by the greatest runlength value MAXR and the sum MAXS of the absolute values of differences in densities of pixels in a direction which makes the runlength maximum, found in the maximum/minimum pixel feature-amount calculation section 62.

FIG. 7(a) shows the characteristics indicated by the greatest runlength value MAXR and the sum MAXS of the absolute values of differences in densities of pixels in a direction which makes the runlength maximum in a mesh area. In this case, pixels within white portions are pixels (base pixels) located within base areas, and the pixels in the areas with slanting lines are pixels having density values not less than a predetermined density. This shows that since the mesh area is constituted by comparatively small areas and since the change in density takes place abruptly, the greatest runlength value MAXR is small and the sum MAXS of the absolute values of differences is great.

FIG. 7(b) shows the characteristics indicated by the greatest runlength value MAXR and the sum MAXS of the absolute values of differences in densities of pixels in a direction which makes the runlength maximum in a character area. In the same manner, pixels within white portions are pixels (base pixels) located within base areas, and the pixels in the areas with slanting lines are pixels having density values not less than a predetermined density. This shows that since the character area is constituted by comparatively large areas and since the change in density takes place gradually, the greatest runlength value MAXR is great and the sum MAXS of the absolute values of differences is small.

Figure 8:
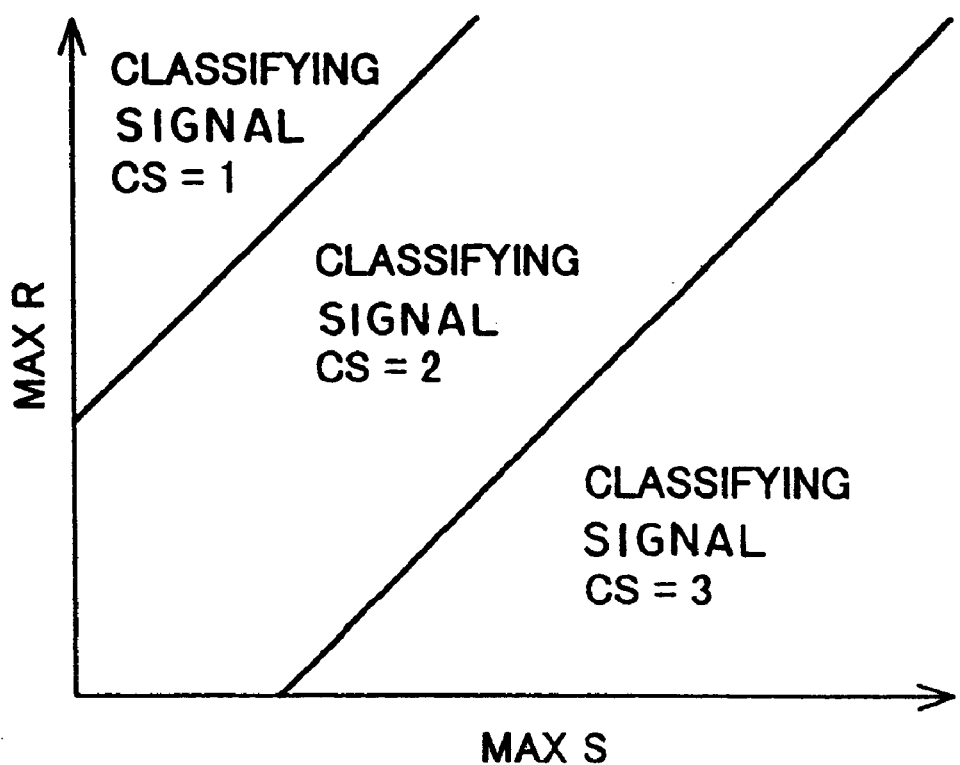
FIG. 8 is a graph showing areas to which respective pixels belong, that are classified based upon the amount of feature calculated by the maximum/minimum pixel feature-amount calculation section.

Next, referring to FIG. 8, an explanation will be given of a classifying method of pixels in the maximum/minimum pixel classifying section 63. Taking into consideration the greatest runlength value MAXR and the sum MAXS of the absolute values of differences in the mesh area and character area as described above, and using the discrimination signal PD from the maximum/minimum pixel detection section 61 as well, a method is proposed in which, for example, the following classifying signal CS is generated with respect to a target pixel B.

If PD=0; then, classifying signal CS=0 (non-maximum or non-minimum).

If PD=1, MAXR is great and MAXS is small; then, classifying signal CS=1 (maximum pixel or minimum pixel seen mostly in a character area).

If PD=1, MAXR is small and MAXS is great; then, classifying signal CS=3 (maximum pixel or minimum pixel seen mostly in a mesh area).

If PD=1, MAXR is medium and MAXS is medium; then, classifying signal CS=2 (maximum pixel or minimum pixel not belonging to classifying signal 1 or 3).

In this manner, the maximum pixel or the minimum pixel within the first local block, detected based upon the greatest runlength value MAXR and the sum MAXS of the absolute values of differences in pixel densities in the direction which makes the runlength maximum, is classified by using the classifying signal CSij. Here, the classifying signal CSij is stored in the block memory B as shown in FIG. 9.

Figure 10:
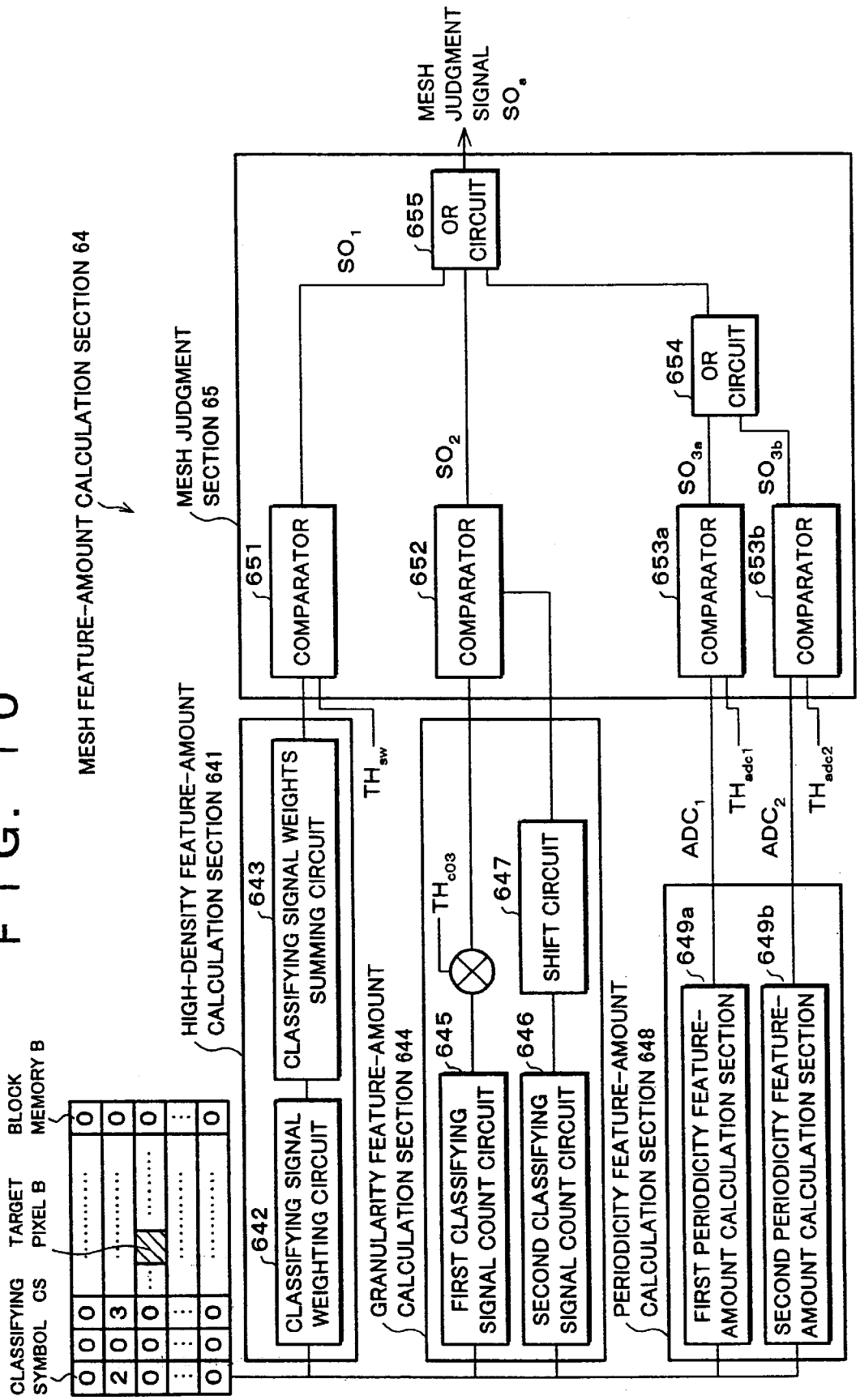
FIG. 10 is an explanatory drawing that shows detailed constructions of a mesh feature-amount calculation section and a mesh judgment section that constitute the area-separation processing section.
Figure 11:
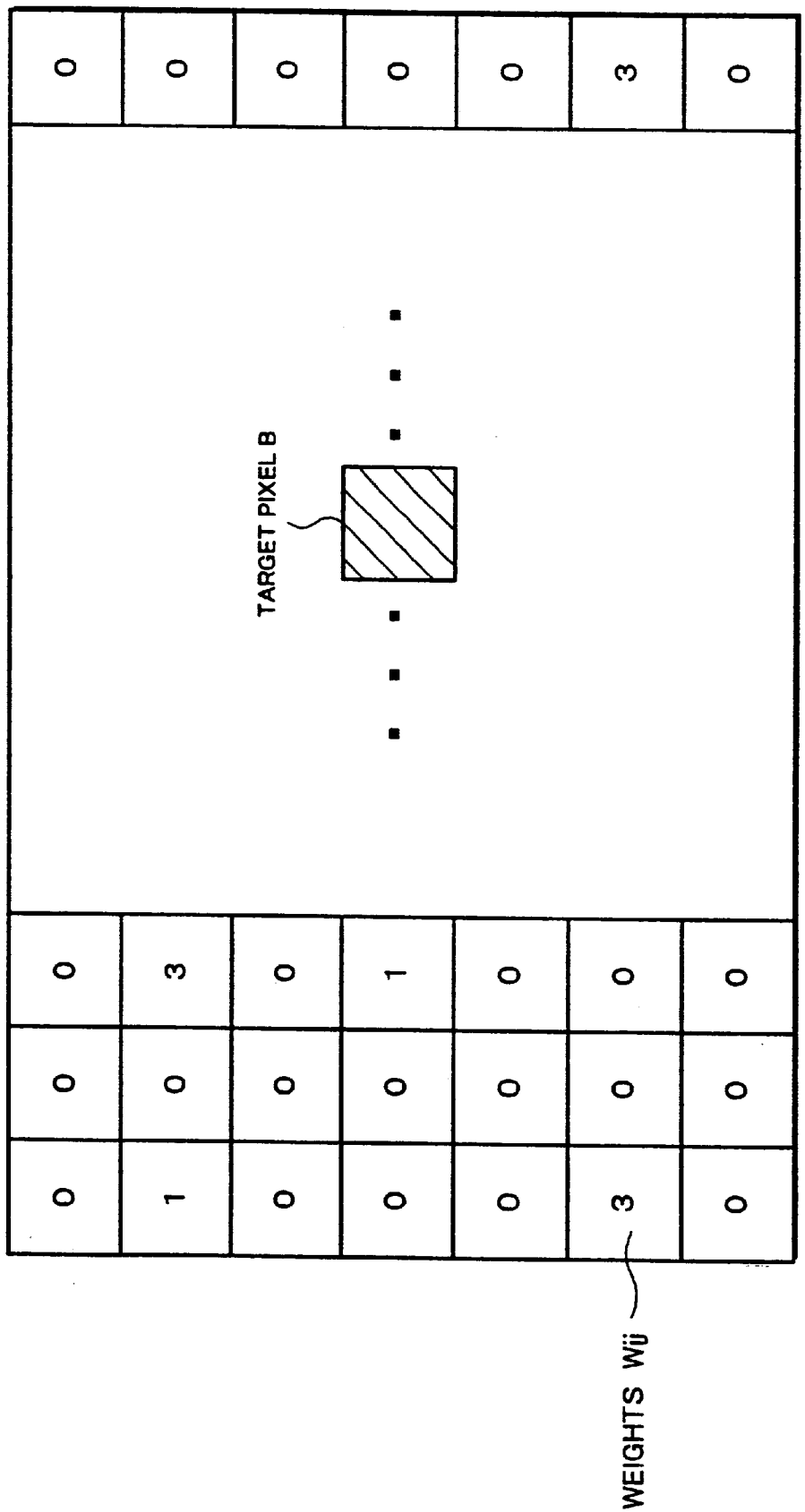
FIG. 11 is an explanatory drawing that shows a state in which classifying signals for the second block memory are converted into weighting signals.
Figure 13:
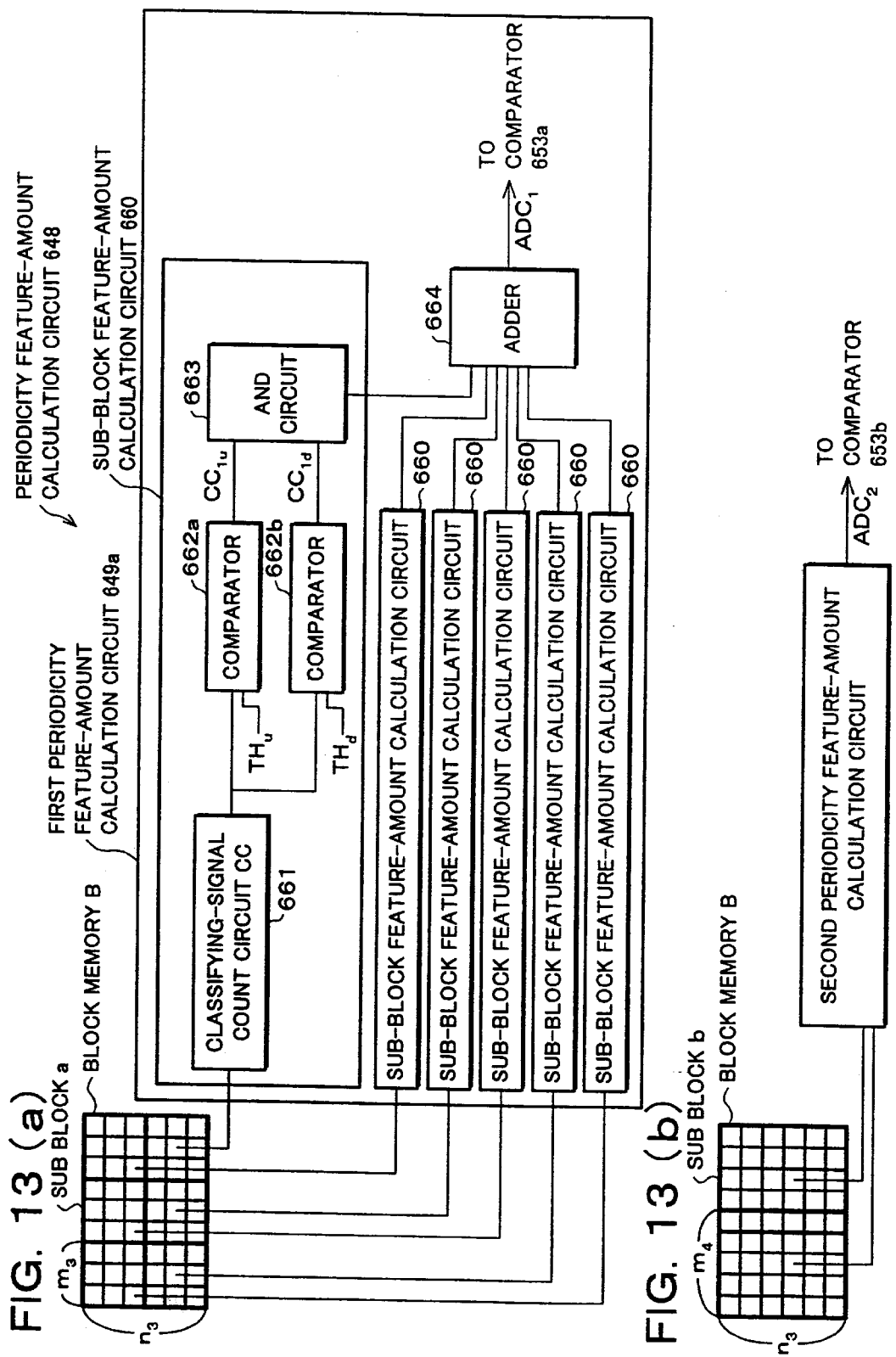
FIG. 13($a$) is an explanatory drawing that shows a detailed construction of a first periodic feature-amount calculation section installed in the mesh feature-amount calculation section, and FIG. 13($b$) is an explanatory drawing that shows a detailed construction of a second periodic feature-amount calculation section installed in the mesh feature-amount calculation section.

Next, FIG. 10 shows the constructions of the mesh feature-amount calculation section 64 and the mesh judgement section 65. The mesh feature-amount calculation section 64 is constituted by a high-density feature-amount calculation section 641, a granularity feature-amount calculation section 644 and a periodicity feature-amount calculation section 648.

The high-density feature-amount calculation section 641 is provided with a classifying signal weighting circuit 642 and a classifying signal weights summing circuit 643. The classifying signal weighting circuit 642 carries out weighting processes on the classifying signal CSij of the respective pixels stored in the block memory B so that, for example, the following weights Wij are found:

Classifying signal CSij=0: Weight Wij=0

Classifying signal CSij=1: Weight Wij=0

Classifying signal CSij=2: Weight Wij=1

Classifying signal CSij=3: Weight Wij=3

In this case, with respect to pixels (classifying signal CSij=3) supposed to belong to a mesh area, a greater weight Wij is set, while with respect to pixels (classifying signal CSij=0) supposed to be a non-maximum or non-minimum pixel or pixels (classifying signal CSij=1) supposed to belong to a character area, a smaller weight Wij is set. With the application of these processes, for example, the classifying signal CSij stored in the block memory B shown in FIG. 9 is converted into a signal properly weighted shown in FIG. 11.

In the classifying signal weights summing circuit 643, with respect to each classifying signal CSij stored in the block memory B, the sum, $SW=\Sigma Wij$, of weights Wij of respective pixels outputted from the classifying signal weighting circuit 642 is calculated.

The sum SW of weights Wij outputted from the classifying signal weights summing circuit 643 is compared with a threshold value $TH_{sw}$ by a comparator 651 in the mesh judgment section 65, and when $SW>TH_{sw}$ is satisfied, an output signal $SO_1$ corresponding to a discrimination value "1" is outputted, while when $SW>TH_{sw}$ is not satisfied, the output signal $SO_1$ corresponding to a discrimination value "0" is outputted.

With respect to the threshold value $TH_{sw}$, a value which enables a discrimination between the sum SW of weights Wij found in a mesh area and the sum SW of weights Wij found in a character area is adopted. Data related to various images are preliminarily collected, and this value may be set based upon the results thereof.

By finding the sum SW of weights Wij of the classifying signals CSij stored in the block memory B, it is possible to confirm what kind of pixels exist on the periphery of the target pixel B. Moreover, as illustrated in FIG. 12, by comparing the sum SW of the weights Wij with the threshold value $TH_{sw}$, it becomes possible to separate the character area and the mesh area from each other.

The granularity feature-amount calculation section 644 is provided with a first classifying signal count circuit 645 and a second classifying signal count circuit 646. The first classifying signal count circuit 645 calculates the number of pixels that satisfy CSij>0, that is, the number of pixels that satisfy CSij=1, 2, or 3 (first classifying signal), that is, the total number C0 of the maximum or minimum pixels in the classifying signals CSij stored in the block memory B. Moreover, the second classifying signal count circuit 646 calculates the number of pixels that satisfy CSij=3 (second classifying signal), that is, the total number C3 of the maximum or minimum pixels that are supposed to belong to a mesh area in the classifying signals CSij stored in the block memory B. A shift circuit 647 outputs a value $C3_s$ obtained by, for example, shifting to the left by 6 bits the total number C0 of the maximum or minimum pixels that are outputted from the second classifying signal count circuit 646 and supposed to belong to a mesh area. The value $C3_s$ is compared with the result of multiplication made between the total number C0 of the maximum pixels and minimum pixels outputted from the first classifying signal count circuit 645 and a threshold value $TH_{c03}$ by using a multiplier. When $C3_s > C0 \times TH_{c03}$ is satisfied, an output signal $SO_2$ corresponding to a discrimination value "1" is released, while when $C3_s > C0 \times TH_{c03}$ is not satisfied, the output signal $SO_2$ corresponding to a discrimination value "0" is released.

In the granularity feature-amount calculation section 644, a ratio C3/C0 of the total number C3 of the maximum pixels or the minimum pixels that are supposed to belong to a mesh area to the total number C0 of the maximum pixels or the minimum pixels, that is, the ratio of pixels having granularity is obtained. It has been known that the ratio C3/C0 forms a comparatively great value in a mesh area; therefore, in the granularity feature-amount calculation section 644, based upon the result of multiplication between the total number C0 of the maximum pixels or the minimum pixels and the threshold value $TH_{c03}$ and based upon the comparison between the maximum pixels or the minimum pixels that are supposed to belong to a mesh area and the total number C3, that is, by carrying out the multiplication and subtraction, the rate of the pixels having granularity is found, and a judgment is made as to whether or not the target pixel in question is located in a mesh area.

In the case when the judgment as to the mesh area is made based upon the rate of pixels having granularity, the granularity feature-amount calculation section 644 may be constituted by a divider. However, since the application of a divider makes the process more complicated due to the fact that decimal fractions have to be taken into consideration as the threshold value $TH_{c03}$, the above-mentioned arrangement is adopted. With respect to the above-mentioned threshold value $TH_{c03}$, an appropriate value that enables a discrimination between C3/C0 found in the mesh area and C3/C0 found in the character area is adopted. Data related to various images are preliminarily collected, and this value may be set based upon the results thereof.

Next, referring to FIGS. 13(a) and 13(b), a detailed explanation will be given of the periodicity feature-amount calculation section 648. The periodicity feature-amount calculation section 648 deals with the block memory B classified into a plurality of sub blocks, and finds the amount of feature for each of the sub blocks. In the present embodiment, two kinds of sub blocks are used; that is, a sub block a used for high-density meshes ($m_3 \times n_3$, where $m_3$ and $n_3$ are arbitrary integers with $m_3 > 1$, $n_3 > 1$) and a sub block b used for low-density meshes ($m_4 \times n_4$, where $m_4$ and $n_4$ are arbitrary integers with $m_4 > 1$, $n_4 > 1$). Here, $m_4 > m_3$ and $n_4 > n_3$ are satisfied. Moreover, each of the first periodicity feature-amount calculation circuit 649a and the second periodicity feature-amount calculation circuit 649b that constitute the periodicity feature-amount calculation section 648 is provided with a sub-block feature-amount calculation circuit 660 corresponding to each sub block.

FIG. 13(a) shows the first periodicity feature-amount calculation circuit 649a for finding the amount of feature of the sub block a, and FIG. 13(b) shows the second periodicity feature-amount calculation circuit 649b for finding the amount of feature of the sub block b. Here, the constructions of the sub-block feature-amount calculation circuits 660 constituting the first periodicity feature-amount calculation circuit 649a and the second periodicity feature-amount calculation circuit 649b are all the same.

Here, in the present embodiment, the two kinds of sub blocks a and b are used as sub blocks; however, in order to properly deal with various meshes ranging from high-density to low-density, three or more sub blocks having desired different sizes may be used.

Each of the sub-block feature-amount calculation circuit 660 is constituted by a classifying-signal count circuit CC661, two comparators 662a and 662b, and an AND circuit 663.

The above-mentioned classifying-signal count circuit CC661 counts the total number C1 of pixels having classifying signals CSij that satisfy CSij>1, that is, CSij=2, 3 (third classifying signal) among classifying signals CSij stored in each sub block. The total number C1 of the pixels having the classifying signal CSij>1 that are outputted from the classifying-signal count circuit CC661 is compared with a threshold value $TH_u$ in a comparator 662a. When $C1 < TH_u$ is satisfied, an output signal $CC_{lu}$ corresponding to a discrimination value "1" is released, while when $C1 < TH_u$ is not satisfied, the output signal $CC_{lu}$ corresponding to a discrimination value "0" is released. Moreover, the total number C1, outputted from the classifying-signal count circuit CC661, is simultaneously compared with a threshold value $TH_d$ at a comparator 662b, and when $C1 > TH_d$ is satisfied, an output signal $CC_{ld}$ corresponding to a discrimination value "1" is released, while when $C1 > TH_d$ is not satisfied, the output signal $CC_{ld}$ corresponding to a discrimination value "0" is released. Here, with respect to the threshold values $TH_u$ and $TH_d$, a value containing the number of meshes in the corresponding sub block may be set.

In each of the AND circuits 663, a logical product $CC_{lud}$ between the output signal $CC_{lu}$ from the comparator 662a and the output signal $CC_{ld}$ from the comparator 662b is found and released.

Moreover, in the adder 664, the logical products $CC_{lud}$ outputted from the respective AND circuits 663, are added, with the result that, as shown in FIG. 13(a), the result of addition $ADC_1$ is outputted from the first periodicity feature-amount calculation circuit 649a, and as shown in FIG. 13(b), the result of addition $ADC_2$ is outputted from the second periodicity feature-amount calculation circuit 649b.

As shown in FIG. 10, the result of addition $ADC_1$ is compared with a threshold value $TH_{adc1}$ in a comparator 653a constituting the mesh judgment section 65, and when $ADC_1>TH_{ad1}$ is satisfied, an output signal $SO^{3a}$ corresponding to a discrimination value "1" is released, while when $ADC_1>TH_{adc1}$ is not satisfied, the output signal $SO_{3a}$ corresponding to a discrimination value "0" is released.

Similarly, as shown in FIG. 10, the result of addition $ADC_2$ is compared with a threshold value $TH_{adc2}$ in a comparator 653b constituting the mesh judgment section 65, and when $ADC_2>TH_{adc2}$ is satisfied, an output signal $SO^{3b}$ corresponding to a discrimination value "1" is released, while when $ADC_2>TH_{adc2}$ is not satisfied, the output signal $SO^{3b}$ corresponding to a discrimination value "0" is released.

Next, in an OR circuit 654, a logical OR $SO_3$ of the output signals $SO_{3a}$ and $SO^{3b}$ thus outputted is found, and released therefrom as an output signal.

An OR circuit 655 finds a logical OR $SO_a$ of the output signal $SO_1$ from the comparator 651, the output signal $SO_2$ from the comparator 652 and the output signal $SO_3$ from the OR circuit 654. In other words, when at least one of the discrimination values of the output signals $SO_1$, $SO_2$ and $SO_3$ is "1", the discrimination value of the above-mentioned logical OR $SO_a$ becomes "1", and when all the discrimination values of the output signals $SO_1$, $SO_2$ and $SO_3$ are "0", the discrimination value of the above-mentioned logical OR $SO_a$ becomes "0". The logical OR $S_a$ is outputted from the mesh judgment section 65 as a mesh judgment signal for the target pixel B.

Here, in the present embodiment, the two kinds of sub blocks a and b are used so as to properly deal with various meshes ranging from high density to low density; however, it is of course possible to use only one kind of sub block. For example, in the case when only the sub block a of the present embodiment is used, the output signal $SO_{3a}$ found with respect to the sub block a, as it is, is inputted to the OR circuit 655.

In a mesh area, mesh points are periodically arranged; therefore, in order to detect a mesh area by utilizing this condition, the above-mentioned periodicity feature-amount calculation section 648 is used so as to detect the periodicity of a mesh. In other words, the number of pixels (classifying signal CSij=2) which are hardly recognizable as to which they belong to, a character area or a mesh area, and the number of pixels (classifying signal CSij=3) which are supposed to belong to a mesh area are calculated in each sub block, and the total number C1 of the pixels satisfying the classifying signal CSij>1 is compared with predetermined threshold values $TH_d$ and $TH_u$. When the total number C1 is in the range of $TH_d<C1<TH_u$, the result of detection (logical product) $CC_{lud}$ in each sub block satisfies $CC_{lud}=1$, and the resulting judgment is that it is highly possible that the pixels within the sub block belong to a mesh area. The results of detection (logical products) $CC_{lud}$ in all the sub blocks are added, and the result of detection (logical product) $CC_{lud}$ is compared with the threshold value $TH_{adc1}$ or the threshold value $TH_{adb2}$ so that a judgment is made as to the degree of periodicity in the mesh.

Features possessed by a mesh area are classified into the following (a) through (c).

(a) The sum SW of weights Wij is greater than the threshold value $TH_{sw}$, that is, the number of maximum pixels or minimum pixels having great weights is great.

(b) The ratio of the total number C3 of the pixels satisfying the classifying signal CS=3 is greater in comparison with the total number C0 of the pixels satisfying the classifying signal CSij>0, that is, the granularity of the pixels is great.

(c) The number of sub blocks in which the total number C1 of the pixels satisfying the classifying signal CSij>1 corresponds to a predetermined number is greater than a predetermined number; that is, the pixels that are supposed to belong to a mesh area are located with periodicity.

Therefore, in the case when any one of the above-mentioned conditions (a) through (c) is satisfied, it is judged that the target pixel B in the block memory B is located in a mesh area. In other words, in the present embodiment, when the mesh judgment signal $SO_a$ has the discrimination value "1", it is judged that the target pixel B is a pixel belonging to a mesh area.

The area-separation process, carried out by using the above-mentioned area-separation processing section 6, may be applied not only to a mono-color image signal, but also to a color image signal. In the case when the area-separation process is applied to the color image signal, the respective processes are applied to the respective color components (RGB, L* a* b*, CMY, etc.). Such processes make it possible to improve detection precision for the mesh area in a color image.

As described above, the image-processing apparatus of the present invention, which deals with an image signal obtained for each pixel by scanning a document and discriminates the pixel as to which area it is located, a character area, a photograph area or a mesh area, is characterized by comprising: a first block memory for storing image signals of a first local block consisting of a pixel that is designated as a first target pixel and a plurality of pixels on the periphery of the first target pixel; a maximum/minimum pixel detection means which makes a judgment as to whether the first target pixel is a maximum pixel that gives a maximum density value in the first local block or a minimum pixel that gives a minimum density value therein by using the image signals stored in the first block memory; a maximum/minimum pixel feature-amount calculation means which calculates information as to density changes from the first target pixel to the peripheral pixels within the local block by using the image signals stored in the first block memory; a maximum/minimum pixel classifying means which classifies the first target pixel by using a classifying signal obtained based upon outputs from the maximum/minimum pixel detection means and the maximum/minimum pixel feature-amount calculation means; a second block memory for storing classifying signals outputted from the maximum/minimum pixel classifying means with respect to a second local block consisting of a pixel that is designated as a second target pixel and a plurality of pixels on the periphery of the second target pixel; a mesh feature-amount calculation means for calculating the amount of feature of the second target pixel by using the classifying signals of the second local block stored in the second block memory; and a mesh judgment means which makes a judgment as to whether or not the second target pixel is a pixel belonging to a mesh area by using the amount of feature calculated by the mesh feature-amount calculation means.

With the above-mentioned arrangement, the maximum/minimum pixel detection means first makes a judgment as to whether the first target pixel is a maximum pixel that gives a maximum density value in the first local block or a minimum pixel that gives a minimum density value therein by using the image signals stored in the first block memory. Moreover, the maximum/minimum pixel feature-amount calculation means calculates information as to density changes from the first target pixel to the peripheral pixels within the first local block by using the image signals stored in the first block memory.

Next, the maximum/minimum pixel classifying means classifies the first target pixel by using a classifying signal obtained based upon outputs from the maximum/minimum pixel detection means and the maximum/minimum pixel feature-amount calculation means. In addition to the information as to whether the first target pixel is a maximum or minimum pixel, the classifying signal contains information indicating density changes in the peripheral pixels with respect to the first target pixel. Therefore, in the case when the first target pixel is a maximum or minimum pixel, the application of the classifying signal makes it possible to classify whether the first target pixel has a dot shape such as seen in a mesh area or a line shape such as seen in a character area. Since the first target pixel is an arbitrary pixel among image signals, each obtained for each pixel by scanning a document, the classification using the above-mentioned classifying signal can be applied to each pixel of the above-mentioned image signals.

Moreover, in the case when a certain pixel is taken as the second target pixel, the classifying signals with respect to the second local block consisting of the second target pixel and a plurality of pixels on the periphery of the second target pixel are stored in the second block memory. By using these classifying signals, the mesh feature-amount calculation means calculates the amount of feature of the second target pixel. By using this amount of feature, the mesh judgment means makes a judgment as to whether or not the second target pixel is a pixel belonging to a mesh area. Since the second target pixel is an arbitrary pixel among image signals, each obtained for each pixel by scanning a document, the judgment is made for any pixel of the image signals as to whether it belongs to a mesh area or not.

As described above, after having classified each pixel as to what kind of maximum pixel or minimum pixel it forms, a judgment is made as to whether or not it belongs to a mesh area; therefore, the amount of feature of pixels can be calculated by using only maximum or minimum pixels such as seen in a mesh area so that a mesh area is properly detected.

Consequently, it is possible to increase precision in detecting a mesh area, and also to improve precision in discriminating each area by reducing any erroneous detection on a character area.

Moreover, in the image-processing apparatus of the present invention having the above-mentioned arrangement, the maximum/minimum pixel detection means preferably makes a judgment as to whether the first target pixel is a maximum or minimum pixel in the first local block, based upon the average density value of pixels within the first local block, the result of density comparisons between the density value of the first target pixel and density values of the pixels within the first local block, the sum of density coincident pixels that is a total number of pixels within the first local block having density values coincident with the density value of the first target pixel, and the sum of density differences that is a sum of the absolute values of differences between the density value of the first target pixel and density values of the peripheral pixels within the first local block.

In the above-mentioned arrangement, in order to make a judgment as to whether the first target pixel is a maximum or minimum pixel, the maximum/minimum pixel detection means finds the average density value, the result of density comparisons and the sum of density coincident pixels and the sum of density differences. In general, it is considered that the maximum pixel or the minimum pixel has the following characteristics: (1) The density value of the target pixel is greater or smaller than the average density value of pixels located within the respective first local blocks; (2) the density value of the target pixel is greater or smaller than the density value of any one of the peripheral pixels; (3) the number of peripheral pixels having a density value equal to the density value of the target pixel is relatively small; and (4) the sum of the absolute values of the differences between the density value of the target pixel and the density values of the peripheral pixels is great. Therefore, in the case when a judgment is made as to whether the first target pixel is a maximum or minimum pixel by using the above-mentioned factors, such as the maximum/minimum pixel detection means finds the average density value, the result of density comparisons and the sum of density coincident pixels and the sum of density differences, it is possible to make a judgment as to whether the first target pixel is a maximum or minimum pixel by taking into consideration all the above-mentioned characteristics (1) through (4) with respect to the maximum pixel or the minimum pixel. Therefore, it becomes possible to extract only the maximum pixel or the minimum pixel in density located in a document with high precision, by eliminating noise and irregularities that occur at the time of reading the document by using a scanner, etc.

This arrangement makes it possible to discriminate whether or not an area including the first target pixel is a mesh area with high precision, and consequently to carry out an optimal image process on each area of an image so as to achieve high image quality.

Moreover, in the image-processing apparatus of the present invention having the above-mentioned arrangement, the above-mentioned maximum/minimum pixel feature-amount calculation means is preferably provided with a binary means for binarizing pixels within the first local block by using a predetermined threshold value, and a continuous pixel calculation means for calculating the number of continuous pixels having the same value as the first target pixel from the first target pixel in the main-scanning direction or in the sub-scanning direction.

With this arrangement, the maximum/minimum pixel feature-amount calculation means is allowed to calculate the number of continuous pixels that is the number of continuous pixels having the same value as the first target pixel extending from the first target pixel in the main-scanning direction or in the sub-scanning direction by using the continuous pixel calculation means with respect to the pixels in the first local block that have been binarized by the binarizing means. Consequently, it is possible to confirm the length from the base to the maximum or minimum pixel, that is, the pixel-to-pixel distance from a pixel within a base area (base pixel) to the maximum or minimum pixel; therefore, it becomes possible to classify whether the maximum or minimum pixel belongs to a dot area as seen in a mesh area or a line area as seen in a character area with high precision.

Therefore, it is possible to improve the precision in detecting a mesh area, and also to reduce any erroneous detection with respect to a character area. Consequently, it becomes possible to achieve high-quality images by carrying out an optimal image process on each area in an image.

Moreover, in the image-processing apparatus of the present invention having the above-mentioned arrangement, the maximum/minimum pixel feature-amount calculation means is preferably further provided with a diagonal-direction continuous pixel calculation means which calculates the number of continuous pixels having the same value as the first target pixel from the target pixel in a diagonal direction different from the main-scanning direction and the sub-scanning direction, with respect to pixels within the first local block that have been binarized by the binarizing means.

In this arrangement, the maximum/minimum pixel feature-amount calculation means is further provided with the diagonal-direction continuous pixel calculation means which calculates the number of continuous pixels that have the same value as the first target pixel from the target pixel in a diagonal direction different from the main-scanning direction and the sub-scanning direction, with respect to pixels within the first local block that have been binarized by the binarizing means. Therefore, with respect to the maximum or minimum pixel in a character area having a line in the diagonal direction, it is possible to classify it from the maximum or minimum pixel in a mesh area.

Therefore, it is possible to improve the precision in detecting a mesh area, and also to reduce any erroneous detection with respect to a character area more effectively. Consequently, it becomes possible to achieve high-quality images by carrying out an optimal image process on each area in an image.

Moreover, in the image-processing apparatus of the present invention having the above-mentioned arrangement, the maximum/minimum pixel feature-amount calculation means is preferably provided with a density-difference summing means which calculates the sum of density differences in the main-scanning direction or sub-scanning direction, that is, the sum of absolute values of the density differences between the first target pixel and pixels on the periphery of the first target pixel extending in the main-scanning direction or sub-scanning direction.

With this arrangement, since the density-difference summing means installed in the maximum/minimum pixel feature-amount calculation means makes it possible to calculate the sum of density differences in the main-scanning direction or sub-scanning direction, a density difference from a pixel in a base area to the maximum or minimum pixel is obtained. In general, it is considered that the density difference between the maximum or minimum pixel and a pixel in a base area is great in a mesh area and that the density difference between the maximum or minimum pixel and a pixel in a base area is small in a character area. Therefore, by finding the sum of density differences in the main-scanning direction or sub-scanning direction, it becomes possible to classify whether the maximum or minimum pixel on an image belongs to a dot area as seen in a mesh area or a line area as seen in a character area with high precision. Consequently, the amount of feature can be calculated by using only the maximum or minimum pixel such as seen in a mesh area.

Therefore, it is possible to improve the precision in detecting a mesh area, and also to reduce any erroneous detection with respect to a character area more effectively. Consequently, it becomes possible to achieve high-quality images by carrying out an optimal image process on each area in an image.

Moreover, in the image-processing apparatus of the present invention having the above-mentioned arrangement, the maximum/minimum pixel feature-amount calculation means is preferably further provided with a diagonal-direction density-difference summing means which calculates the sum of diagonal-direction density differences, that is, the sum of absolute values of the diagonal-direction density differences between the first target pixel and pixels on the periphery of the target pixels in a diagonal direction different from the main-scanning direction and the sub-scanning direction.

With this arrangement, since the diagonal-direction density-difference summing means installed in the maximum/minimum pixel feature-amount calculation means makes it possible to calculate the sum of diagonal-direction density differences, a density difference from a pixel in a base area to the maximum or minimum pixel is obtained, even in the case when the maximum or minimum pixel is in a character area having a line in a diagonal direction different from the main-scanning direction and sub-scanning direction. In general, it is considered that the density difference between the maximum or minimum pixel and a pixel in a base area is great in a mesh area and that the density difference between the maximum or minimum pixel and a pixel in a base area is small in a character area. Therefore, even with respect to the maximum or minimum pixel in a character area having a line in the diagonal direction, by finding the sum of density differences in a diagonal direction, it becomes possible to classify it from the maximum or minimum pixel in a mesh area. Consequently, the amount of feature can be calculated by using only the maximum or minimum pixel such as seen in a mesh area.

Therefore, it is possible to improve the precision in detecting a mesh area, and also to effectively reduce any erroneous detection with respect to a character area more effectively. Consequently, it becomes possible to achieve high-quality images by carrying out an optimal image process on each area in an image.

Furthermore, in the image-processing apparatus of the present invention having the above-mentioned arrangement, the mesh feature-amount calculation means is preferably designed to calculate weights of the respective pixels within the second local block based upon the aforementioned classifying signals and to obtain the sum of the weights as the amount of feature.

With this arrangement the mesh feature-amount calculation means provides the sum of weights of the respective pixels within the second local block, each found based upon the corresponding classifying signal, as the amount of feature; therefore, it is possible to confirm what kind of pixels exist on the periphery of the second target pixel. For example, the maximum or minimum pixel as seen in a mesh area is subjected to a weight greater than that applied to the maximum or minimum pixel as seen in a character area so that the sum of weights in a mesh area becomes a value greater than that of a character area, thereby making it possible to positively classify the mesh area and the character area.

Therefore, it is possible to improve the precision in detecting a mesh area, and also to reduce any erroneous detection with respect to a character area more effectively. Consequently, it becomes possible to achieve high-quality images by carrying out an optimal image process on each area in an image.

Moreover, in the image-processing apparatus of the present invention having the above-mentioned arrangement, supposing that classifying signals applied to all the maximum or minimum pixels extracted in the second local block are first classifying signals and that classifying signals applied to the maximum or minimum pixels that are supposed to belong to mesh areas are second classifying signals, the mesh feature-amount calculation means is preferably designed to calculate the ratio of the total number of the pixels having the second classifying signals to the total number of the pixels having the first classifying signals, as the amount of feature.

With the above-mentioned arrangement, the mesh feature-amount calculation means calculates the ratio of the total number of the pixels having the second classifying signals to the total number of the pixels having the first classifying signals as the amount of feature in such a manner that the ratio of the total number of the maximum or minimum pixels having a dot shape as seen in a mesh area to the total number of the maximum or minimum pixels seen in all the areas in the second local block is calculated. In other words, the ratio of pixels having granularity is found in the second local block. In general, the maximum or minimum pixel in a mesh area has granularity; therefore, by finding the ratio of pixels having granularity, it becomes possible to carry out a detecting operation with high precision even on a mesh area having a small number of lines in which the number of the maximum or minimum pixels is small.

Therefore, it is possible to further improve the precision in detecting a mesh area, and also to reduce any erroneous detection with respect to a character area more effectively. Consequently, it becomes possible to achieve high-quality images by carrying out an optimal image process on each area in an image.

Moreover, in the image-processing apparatus of the present invention having the above-mentioned arrangement, with respect to each of a plurality of sub blocks formed by finely dividing the second block memory, the mesh feature-amount calculation means calculates the total number of pixels having third classifying signals that are specific classifying signals so that the number of the sub blocks in which the total number of pixels having the third classifying signals is in a predetermined range is calculated as the amount of feature.

With this arrangement, the mesh feature-amount calculation means calculates the number of the sub blocks in which the total number of pixels having the third classifying signals is in a predetermined range as the amount of feature so that the periodicity of the maximum or minimum pixels within the second local block is found in an approximate manner. In general, the maximum or minimum pixel belonging to a mesh area has a periodicity; therefore, by finding the periodicity of the maximum or minimum pixel in an approximate manner, it becomes possible to carry out a detecting operation with high precision even on a mesh area having a small number of lines in which the number of the maximum or minimum pixels is small.

Therefore, it is possible to improve the precision in detecting a mesh area, and also to reduce any erroneous detection with respect to a character area more effectively. Consequently, it becomes possible to achieve high-quality images by carrying out an optimal image process on each area in an image.

Furthermore, in the image-processing apparatus of the present invention having the above-mentioned arrangement, the above-mentioned image signal may be replaced by a color image signal.

With this arrangement, the detection for a mesh area can be carried out not only on monochrome images, but also on color images. Here, in the color image, the detection is carried out, for example, on each of the signals for the respective colors R, G and B so that it is possible to improve the precision in detecting a mesh area in a color image.

Therefore, it becomes possible to also carry out an optimal image process on each area in a color image, and consequently to achieve high image quality.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image-processing apparatus, which deals with an image signal obtained for each pixel by scanning a document and discriminates the pixel as to which area it is located, a character area, a photograph area or a mesh area, characterized by comprising:

a first block memory for storing image signals of a first local block consisting of a pixel that is designated as a first target pixel and a plurality of pixels on the periphery of the first target pixel;

a maximum/minimum pixel detection section which makes a judgment as to whether the first target pixel is a maximum pixel that gives a maximum density value in the first local block or a minimum pixel that gives a minimum density value therein by using the image signals stored in the first block memory;

a maximum/minimum pixel feature-amount calculation section which calculates information as to density changes from the first target pixel to the peripheral pixels within the local block by using the image signals stored in the first block memory;

a maximum/minimum pixel classifying section which classifies the first target pixel by using a classifying signal obtained based upon outputs from the maximum/minimum pixel detection section and the maximum/minimum pixel feature-amount calculation section, respectively;

a second block memory for storing classifying signals outputted from the maximum/minimum pixel classifying section with respect to a second local block consisting of a pixel that is designated as a second target pixel and a plurality of pixels on the periphery of the second target pixel;

a mesh feature-amount calculation section for calculating the amount of feature of the second target pixel by using the classifying signals of the second local block stored in the second block memory; and a mesh judgment section which makes a judgment as to whether or not the second target pixel is a pixel belonging to a mesh area by using the amount of feature calculated by the mesh feature-amount calculation section , wherein said maximum/minimum pixel detection section makes a judgment as to whether the first target pixel is the maximum or minimum pixel in the first local block, based upon the average density value of pixels within the first local block, the result of density comparisons between the density value of the first target pixel and density values of the pixels within the first local block, the sum of density coincident pixels that is a total number of pixels within the first local block having density values coincident with the density value of the first target pixel, and the sum of density differences that is a sum of the absolute values of differences between the density value of the first target pixel and density values of the peripheral pixels within the first local block.

2. The image-processing apparatus as defined in claim 1, wherein said maximum/minimum pixel feature-amount calculation section comprises a binarizing section for binarizing pixels within the first local block by using a predetermined threshold value, and a continuous pixel calculation section for calculating the number of continuous pixels having the same value as the first target pixel in at least one direction of either of the main-scanning direction and the sub-scanning direction from the first target pixel, with respect to binarized pixels.

3. The image-processing apparatus as defined in claim 2, wherein the maximum/minimum pixel feature-amount calculation section further comprises a diagonal-direction continuous pixel calculation section which calculates the number of continuous pixels having the same value as the first target pixel in a diagonal direction different from the main-scanning direction and the sub-scanning direction from the first target pixel, with respect to pixels within the first local block that have been binarized by the binarizing section.

4. The image-processing apparatus as defined in claim 3, wherein the maximum/minimum pixel feature-amount calculation section further comprises a diagonal-direction density-difference summing section which calculates the sum of diagonal-direction density differences, that is, the sum of absolute values of the diagonal-direction density differences between the first target pixel and pixels on the periphery of the target pixels in a diagonal direction different from the main-scanning direction and the sub-scanning direction.

5. The image-processing apparatus as defined in claim 3, wherein the maximum/minimum pixel feature-amount calculation section comprises a density-difference summing section which calculates the sum of density differences in the main-scanning direction, that is, the sum of absolute values of the density differences between the first target pixel and pixels on the periphery of the first target pixel extending in a main-scanning direction.

6. The image-processing apparatus as defined in claim 5, wherein the maximum/minimum pixel feature-amount calculation section further comprises a diagonal-direction density-difference summing section which calculates the sum of diagonal-direction density differences, that is, the sum of absolute values of the diagonal-direction density differences between the first target pixel and pixels on the periphery of the target pixels in a diagonal direction different from the main-scanning direction and the sub-scanning direction.

7. The image-processing apparatus as defined in claim 2, wherein the maximum/minimum pixel feature-amount calculation section comprises a density-difference summing section which calculates the sum of density differences in the sub-scanning direction, that is, the sum of absolute values of the density differences between the first target pixel and pixels on the periphery of the first target pixel extending in a sub-scanning direction.

8. The image-processing apparatus as defined in claim 7, wherein the maximum/minimum pixel feature-amount calculation section further comprises a diagonal-direction density-difference summing section which calculates the sum of diagonal-direction density differences, that is, the sum of absolute values of the diagonal-direction density differences between the first target pixel and pixels on the periphery of the target pixels in a diagonal direction different from the main-scanning direction and the sub-scanning direction.

9. The image-processing apparatus as defined in claim 1, wherein the mesh feature-amount calculation section is designed to calculate weights of the respective pixels within the second local block based upon the classifying signals and to obtain the sum of the weights as the amount of feature.

10. The image-processing apparatus as defined in claim 1, wherein said image signal is a color image signal.

11. The image-processing apparatus as defined in claim 1, wherein the mesh feature-amount calculation section comprises a high-density feature-amount calculation section for calculating weights of the respective pixels within the second local block based upon the classifying signals so as to obtain the sum of the weights as the amount of feature.

12. The image-processing apparatus as defined in claim 11, wherein the high-density feature-amount calculation section comprises:
   a classifying signal weighting circuit for carrying out a weighting process on each pixel by using the classifying signal, and
   a classifying signal weight summing circuit for calculating the sum of weights of the respective pixels outputted from the classifying signal weighting circuit.

13. An image-processing apparatus, which deals with an image signal obtained for each pixel by scanning a document and discriminates the pixel as to which area it is located, a character area, a photograph area or a mesh area, characterized by comprising:
   a first block memory for storing image signals of a first local block consisting of a pixel that is designated as a first target pixel and a plurality of pixels on the periphery of the first target pixel;
   a maximum/minimum pixel detection section which makes a judgment as to whether the first target pixel is a maximum pixel that gives a maximum density value in the first local block or a minimum pixel that gives a minimum density value therein by using the image signals stored in the first block memory;
   a maximum/minimum pixel feature-amount calculation section which calculates information as to density changes from the first target pixel to the peripheral pixels within the local block by using the image signals stored in the first block memory;
   a maximum/minimum pixel classifying section which classifies the first target pixel by using a classifying signal obtained based upon outputs from the maximum/minimum pixel detection section and the maximum/minimum pixel feature-amount calculation section, respectively;
   a second block memory for storing classifying signals outputted from the maximum/minimum pixel classifying section with respect to a second local block consisting of a pixel that is designated as a second target pixel and a plurality of pixels on the periphery of the second target pixel;
   a mesh feature-amount calculation section for calculating the amount of feature of the second target pixel by using the classifying signals of the second local block stored in the second block memory; and
   a mesh judgment section which makes a judgment as to whether or not the second target pixel is a pixel belonging to a mesh area by using the amount of feature calculated by the mesh feature-amount calculation section,
wherein, supposing that classifying signals applied to all of the maximum or minimum pixels extracted in the second local block are first classifying signals and that classifying signals applied to the maximum or minimum pixels that are supposed to belong to mesh areas are second classifying signals, the mesh feature-amount calculation section is designed to calculate the ratio of the total number of the pixels having the second classifying signals to the total number of the pixels having the first classifying signals, as the amount of feature.

14. An image-processing apparatus, which deals with an image signal obtained for each pixel by scanning a document and discriminates the pixel as to which area it is located, a character area, a photograph area or a mesh area, characterized by comprising:

a first block memory for storing image signals of a first local block consisting of a pixel that is designated as a first target pixel and a plurality of pixels on the periphery of the first target pixel;

a maximum/minimum pixel detection section which makes a judgment as to whether the first target pixel is a maximum pixel that gives a maximum density value in the first local block or a minimum pixel that gives a minimum density value therein by using the image signals stored in the first block memory;

a maximum/minimum pixel feature-amount calculation section which calculates information as to density changes from the first target pixel to the peripheral pixels within the local block by using the image signals stored in the first block memory;

a maximum/minimum pixel classifying section which classifies the first target pixel by using a classifying signal obtained based upon outputs from the maximum/minimum pixel detection section and the maximum/minimum pixel feature-amount calculation section, respectively;

a second block memory for storing classifying signals outputted from the maximum/minimum pixel classifying section with respect to a second local block consisting of a pixel that is designated as a second target pixel and a plurality of pixels on the periphery of the second target pixel;

a mesh feature-amount calculation section for calculating the amount of feature of the second target pixel by using the classifying signals of the second local block stored in the second block memory; and a mesh judgment section which makes a judgment as to whether or not the second target pixel is a pixel belonging to a mesh area by using the amount of feature calculated by the mesh feature-amount calculation section, wherein, with respect to each of a plurality of sub blocks formed by finely dividing the second block memory, the mesh feature-amount calculation section calculates the total number of pixels having third classifying signals that are specific classifying signals so that the number of the sub blocks in which the total number of pixels having the third classifying signals is in a predetermined range is calculated as the amount of feature.

15. An image-processing apparatus, which deals with an image signal obtained for each pixel by scanning a document and discriminates the pixel as to which area it is located, a character area, a photograph area or a mesh area, characterized by comprising:

a first block memory for storing image signals of a first local block consisting of a pixel that is designated as a first target pixel and a plurality of pixels on the periphery of the first target pixel;

a maximum/minimum pixel detection section which makes a judgment as to whether the first target pixel is a maximum pixel that gives a maximum density value in the first local block or a minimum pixel that gives a minimum density value therein by using the image signals stored in the first block memory;

a maximum/minimum pixel feature-amount calculation section which calculates information as to density changes from the first target pixel to the peripheral pixels within the local block by using the image signals stored in the first block memory;

a maximum/minimum pixel classifying section which classifies the first target pixel by using a classifying signal obtained based upon outputs from the maximum/minimum pixel detection section and the maximum/minimum pixel feature-amount calculation section, respectively;

a second block memory for storing classifying signals outputted from the maximum/minimum pixel classifying section with respect to a second local block consisting of a pixel that is designated as a second target pixel and a plurality of pixels on the periphery of the second target pixel;

a mesh feature-amount calculation section for calculating the amount of feature of the second target pixel by using the classifying signals of the second local block stored in the second block memory; and a mesh judgment section which makes a judgment as to whether or not the second target pixel is a pixel belonging to a mesh area by using the amount of feature calculated by the mesh feature-amount calculation section, wherein said maximum/minimum pixel feature-amount calculation section comprises a binarizing circuit for binarizing pixels within the first local block by using a predetermined threshold value, and a main-scanning-direction runlength-difference summing circuit which calculates the number of continuous pixels having the same value as the first target pixel in the main-scanning direction from the first target pixel, and also calculates the sum of the absolute values of differences between the density value of the target pixel and the density values of the peripheral pixels located in the main-scanning direction from the first target pixel, with respect to the binarized pixels.

16. The image-processing apparatus as defined in claim 14, wherein said maximum/minimum pixel feature-amount calculation section comprises a binarizing circuit for binarizing pixels within the first local block by using a predetermined threshold value, and a sub-scanning-direction runlength-difference summing circuit which calculates the number of continuous pixels having the same value as the first target pixel in the sub-scanning direction from the first target pixel, and also calculates the sum of the absolute values of differences between the density value of the target pixel and the density values of the peripheral pixels located in the sub-scanning direction from the first target pixel, with respect to the binarized pixels.

17. The image-processing apparatus as defined in claim 14, wherein said maximum/minimum pixel feature-amount calculation section comprises a diagonal-direction runlength-difference summing circuit which calculates the number of continuous pixels having the same value as the first target pixel in a diagonal direction from the first target pixel, and also calculates the sum of the absolute values of differences between the density value of the target pixel and the density values of the peripheral pixels located in the diagonal direction from the first target pixel, with respect to the pixels within the first local block that have been binarized by the binarizing circuit.

18. An image-processing apparatus, which deals with an image signal obtained for each pixel by scanning a document and discriminates the pixel as to which area it is located, a character area, a photograph area or a mesh area, characterized by comprising:

a first block memory for storing image signals of a first local block consisting of a pixel that is designated as a first target pixel and a plurality of pixels on the periphery of the first target pixel;

a maximum/minimum pixel detection section which makes a judgment as to whether the first target pixel is a maximum pixel that gives a maximum density value in the first local block or a minimum pixel that gives a minimum density value therein by using the image signals stored in the first block memory;

a maximum/minimum pixel feature-amount calculation section which calculates information as to density changes from the first target pixel to the peripheral pixels within the local block by using the image signals stored in the first block memory;

a maximum/minimum pixel classifying section which classifies the first target pixel by using a classifying signal obtained based upon outputs from the maximum/minimum pixel detection section and the maximum/minimum pixel feature-amount calculation section, respectively;

a second block memory for storing classifying signals outputted from the maximum/minimum pixel classifying section with respect to a second local block consisting of a pixel that is designated as a second target pixel and a plurality of pixels on the periphery of the second target pixel;

a mesh feature-amount calculation section for calculating the amount of feature of the second target pixel by using the classifying signals of the second local block stored in the second block memory; and a mesh judgment section which makes a judgment as to whether or not the second target pixel is a pixel belonging to a mesh area by using the amount of feature calculated by the mesh feature-amount calculation section, wherein said maximum/minimum pixel feature-amount calculation section comprises a binarizing circuit for binarizing pixels within the first local block by using a predetermined threshold value, and a sub-scanning-direction runlength-difference summing circuit which calculates the number of continuous pixels having the same value as the first target pixel in the sub-scanning direction from the first target pixel, and also calculates the sum of the absolute values of differences between the density value of the target pixel and the density values of the peripheral pixels located in the sub-scanning direction from the first target pixel, with respect to the binarized pixels.

19. The image-processing apparatus as defined in claim 18, wherein said maximum/minimum pixel feature-amount calculation section comprises a diagonal-direction runlength-difference summing circuit which calculates the number of continuous pixels having the same value as the first target pixel in a diagonal direction from the first target pixel, and also calculates the sum of the absolute values of differences between the density value of the target pixel and the density values of the peripheral pixels located in the diagonal direction from the first target pixel, with respect to the pixels within the first local block that have been binarized by the binarizing circuit.

20. An image-processing apparatus, which deals with an image signal obtained for each pixel by scanning a document and discriminates the pixel as to which area it is located, a character area, a photograph area or a mesh area, characterized by comprising:

a first block memory for storing image signals of a first local block consisting of a pixel that is designated as a first target pixel and a plurality of pixels on the periphery of the first target pixel;

a maximum/minimum pixel detection section which makes a judgment as to whether the first target pixel is a maximum pixel that gives a maximum density value in the first local block or a minimum pixel that gives a minimum density value therein by using the image signals stored in the first block memory;

a maximum/minimum pixel feature-amount calculation section which calculates information as to density changes from the first target pixel to the peripheral pixels within the local block by using the image signals stored in the first block memory;

a maximum/minimum pixel classifying section which classifies the first target pixel by using a classifying signal obtained based upon outputs from the maximum/minimum pixel detection section and the maximum/minimum pixel feature-amount calculation section, respectively;

a second block memory for storing classifying signals outputted from the maximum/minimum pixel classifying section with respect to a second local block consisting of a pixel that is designated as a second target pixel and a plurality of pixels on the periphery of the second target pixel;

a mesh feature-amount calculation section for calculating the amount of feature of the second target pixel by using the classifying signals of the second local block stored in the second block memory; and a mesh judgment section which makes a judgment as to whether or not the second target pixel is a pixel belonging to a mesh area by using the amount of feature calculated by the mesh feature-amount calculation section, wherein the mesh feature-amount calculation section comprises:

a granularity feature-amount calculation section which, supposing that classifying signals applied to all the maximum or minimum pixels extracted in the second local block are first classifying signals and that classifying signals applied to the maximum or minimum pixels that are supposed to belong to mesh areas are second classifying signals, calculates the ratio of the total number of the pixels having the second classifying signals to the total number of the pixels having the first classifying signals, as the amount of feature.

21. An image-processing apparatus, which deals with an image signal obtained for each pixel by scanning a document and discriminates the pixel as to which area it is located, a character area, a photograph area or a mesh area, characterized by comprising:

a first block memory for storing image signals of a first local block consisting of a pixel that is designated as a first target pixel and a plurality of pixels on the periphery of the first target pixel;

a maximum/minimum pixel detection section which makes a judgment as to whether the first target pixel is a maximum pixel that gives a maximum density value in the first local block or a minimum pixel that gives a minimum density value therein by using the image signals stored in the first block memory;

a maximum/minimum pixel feature-amount calculation section which calculates information as to density changes from the first target pixel to the peripheral pixels within the local block by using the image signals stored in the first block memory;

a maximum/minimum pixel classifying section which classifies the first target pixel by using a classifying signal obtained based upon outputs from the maximum/minimum pixel detection section and the maximum/minimum pixel feature-amount calculation section, respectively;

a second block memory for storing classifying signals outputted from the maximum/minimum pixel classifying section with respect to a second local block consisting of a pixel that is designated as a second target pixel and a plurality of pixels on the periphery of the second target pixel;

a mesh feature-amount calculation section for calculating the amount of feature of the second target pixel by using the classifying signals of the second local block stored in the second block memory; and a mesh judgment section which makes a judgment as to whether or not the second target pixel is a pixel belonging to a mesh area by using the amount of feature calculated by the mesh feature-amount calculation section, wherein the mesh feature-amount calculation section comprises a periodicity feature-amount calculation circuit which, with respect to each of a plurality of sub blocks formed by finely dividing the second block memory, calculates the total number of pixels having third classifying signals that are specific classifying signals so that the number of the sub blocks in which the total number of pixels having the third classifying signals is in a predetermined range is calculated as the amount of feature.

22. The image-processing apparatus as defined in claim 21, wherein the periodicity feature-amount calculation circuit comprises a sub-block feature-amount calculation circuit for calculating the sum of pixels having the third classifying signals that are specific classifying signals.

23. The image-processing apparatus as defined in claim 21, wherein a plurality of kinds of sub blocks having different sizes are used as the sub blocks.

24. The image-processing apparatus as defined in claim 23, wherein a plurality of said periodicity feature-amount calculation circuits are installed in association with the plurality of kinds of the sub blocks.

* * * * *